United States Patent
Nishioka et al.

(10) Patent No.: US 11,668,914 B2
(45) Date of Patent: Jun. 6, 2023

(54) ZOOM LENS SYSTEM, AND LENS BARREL, IMAGE CAPTURE DEVICE, AND CAMERA SYSTEM INCLUDING THE ZOOM LENS SYSTEM

(71) Applicant: Panasonic Intellectual Property Management Co., Ltd., Osaka (JP)

(72) Inventors: Takehiro Nishioka, Nara (JP); Hisayuki II, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 17/085,457

(22) Filed: Oct. 30, 2020

(65) Prior Publication Data
US 2021/0132345 A1  May 6, 2021

(30) Foreign Application Priority Data

Nov. 1, 2019 (JP) .............................. JP2019-199522
Sep. 29, 2020 (JP) .............................. JP2020-164075

(51) Int. Cl.
*G02B 15/14* (2006.01)
*G02B 7/14* (2021.01)
*G03B 5/00* (2021.01)

(52) U.S. Cl.
CPC ........... *G02B 15/1461* (2019.08); *G02B 7/14* (2013.01); *G03B 5/00* (2013.01); *G03B 2205/0046* (2013.01)

(58) Field of Classification Search
CPC .... G02B 15/146; G02B 15/1461; G02B 7/14; G02B 15/145; G02B 15/1451;

(Continued)

(56) References Cited

U.S. PATENT DOCUMENTS

2014/0218808 A1* 8/2014 Ogata .................. G02B 15/163
                                                                  359/695
2016/0209632 A1* 7/2016 Imaoka .............. G02B 15/1465
2021/0349293 A1* 11/2021 Uehara .............. G02B 15/1461

FOREIGN PATENT DOCUMENTS

JP      2004-212612      7/2004

OTHER PUBLICATIONS

H. Gross, Handbook of Optical Systems, 2007, Wiley, pp. 377-378 (Year: 2007).*

* cited by examiner

*Primary Examiner* — Marin Pichler
(74) *Attorney, Agent, or Firm* — Wenderoth, Lind & Ponack L.L.P.

(57) ABSTRACT

A zoom lens system includes: a first lens group having positive power; a second lens group having negative power; and following lens groups. The following lens groups include: a first focus lens group having negative power; and a second focus lens group having positive power, arranged adjacent to, and closer to the image than, the first focus lens group. The first and second focus lens groups move along an optical axis during focusing from an infinity focus point on a close focus point. During zooming from a wide-angle end toward a telephoto end, intervals between lens groups change with the first lens group fixed with respect to an image plane. The zoom lens system satisfies the Inequality −0.23<f2/TTL<−0.15, where TTL is an optical total length at the telephoto end and f2 is a focal length of the second lens group.

14 Claims, 10 Drawing Sheets

(58) Field of Classification Search
CPC ...... G02B 15/14505; G02B 15/145109; G02B 15/145117; G02B 15/145121; G02B 15/144; G02B 15/1441; G02B 15/144109; G03B 5/00; G03B 2205/0046
See application file for complete search history.

ZOOM LENS SYSTEM, AND LENS BARREL, IMAGE CAPTURE DEVICE, AND CAMERA SYSTEM INCLUDING THE ZOOM LENS SYSTEM

CROSS-REFERENCE TO RELATED APPLICATION

This application is based on and claims the benefit of foreign priority to Japanese Patent Application No. 2019-199522 filed on Nov. 1, 2019, and Japanese Patent Application No. 2020-164075 filed on Sep. 29, 2020, the entire disclosures of which are hereby incorporated by reference.

TECHNICAL FIELD

The present disclosure relates to a zoom lens system in which various types of aberrations have been compensated for sufficiently over the entire zoom range and which has excellent close-up shooting capability, and also relates to a lens barrel, an image capture device, and a camera system including such a zoom lens system.

BACKGROUND ART

JP 2004-212612 A discloses a zoom lens system including: a first lens group having positive refractive power; a second lens group having negative refractive power; a third lens group having positive refractive power; a fourth lens group having negative refractive power; a fifth lens group having positive refractive power; and a sixth lens group having negative refractive power, where these first through sixth lens groups are arranged in this order such that the first lens group is located closer to an object than any other lens group and that the sixth lens group is located closer to an image than any other lens group. While this zoom lens system is zooming from a wide-angle end toward a telephoto end, the interval between every adjacent pair of lenses changes, thus moving the first lens group toward the object with respect to the image plane.

SUMMARY

The present disclosure provides a zoom lens system in which various types of aberrations have been compensated for sufficiently over the entire zoom range, and also provides a lens barrel, an image capture device, and a camera system including such a zoom lens system.

A zoom lens system according to the present disclosure includes: a first lens group having positive power; a second lens group having negative power; and following lens groups. The first, second, and following lens groups are arranged in this order such that the first lens group is located closer to an object than any other lens group and that the following lens groups are located closer to an image than any other lens group. The following lens groups include: a first focus lens group having negative power; and a second focus lens group having positive power and arranged adjacent to, and closer to the image than, the first focus lens group. The first and second focus lens groups move along an optical axis while the zoom lens system is focusing from an infinity focus point on a close focus point. While the zoom lens system is zooming from a wide-angle end toward a telephoto end, intervals between respective lens groups change while the first lens group is fixed with respect to an image plane. The zoom lens system satisfies the following Inequality (1):

$$-0.23 < f2/TTL < -0.15 \quad (1)$$

where TTL is an optical total length at the telephoto end and f2 is a focal length of the second lens group.

BRIEF DESCRIPTION OF DRAWINGS

The figures depict one or more implementation in accordance with the present teaching, by way of example only, not by way of limitations. In the figures, like reference numerals refer to the same or similar elements.

DESCRIPTION OF EMBODIMENTS

Figure 1:
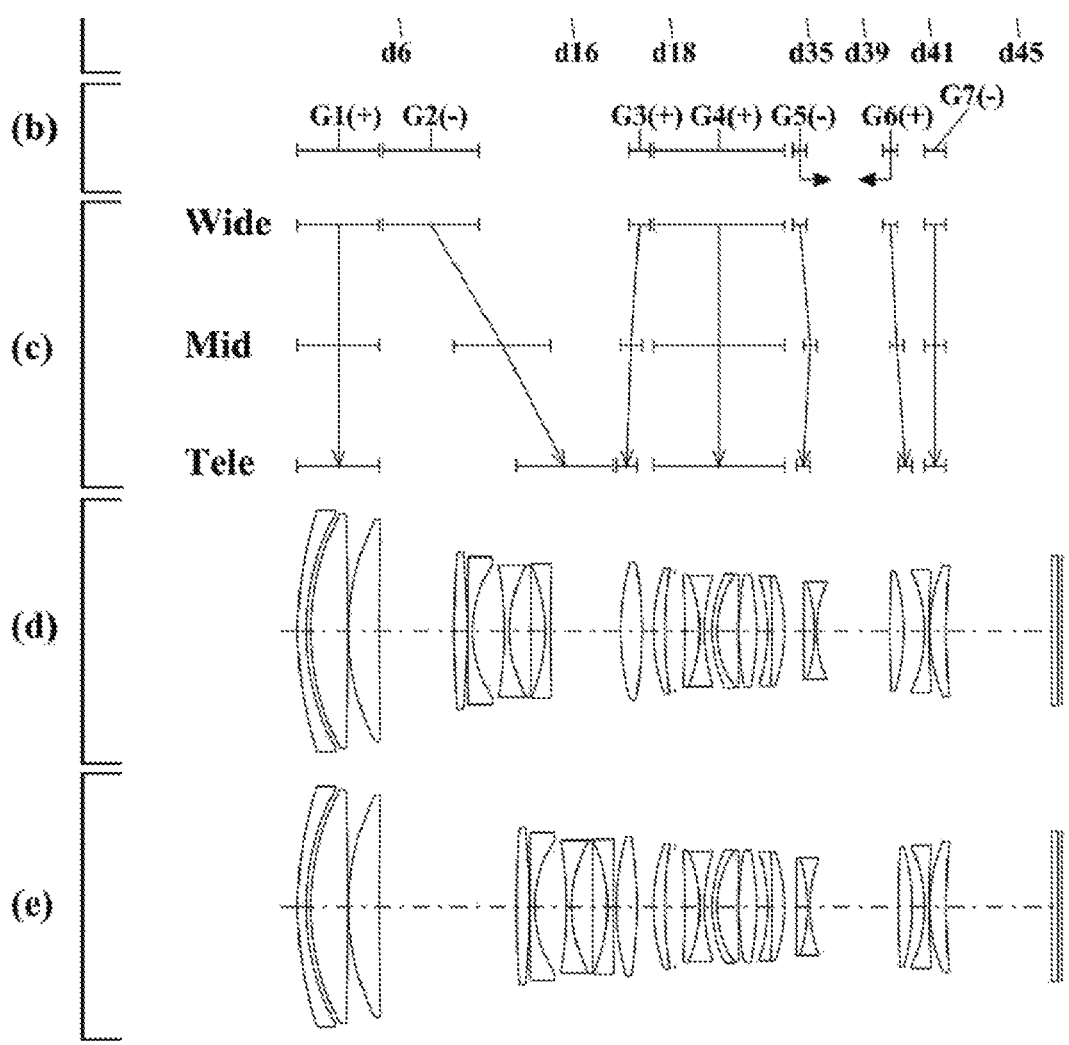
FIG. 1 illustrates lens arrangements showing what state a zoom lens system according to a first embodiment assumes at an infinity focus point.
Figure 2:
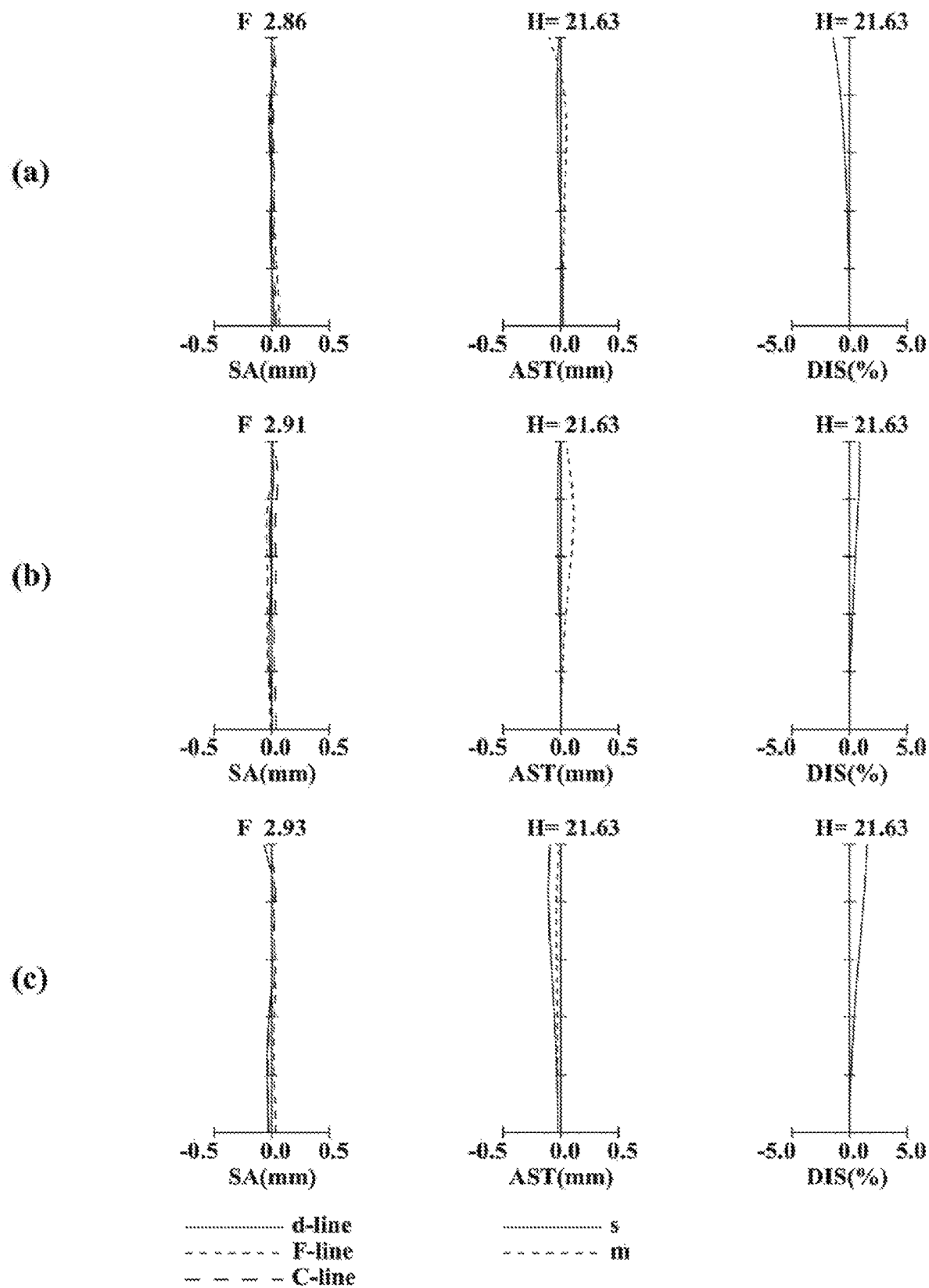
FIG. 2 illustrates longitudinal aberration diagrams showing what state the zoom lens system assumes at the infinity focus point in a first example of numerical values corresponding to the first embodiment.

Embodiments of the present disclosure will be described in detail with reference to the accompanying drawings. Note that unnecessarily detailed description may be omitted. For example, detailed description of already well-known matters and redundant description of substantially the same configuration may be omitted. This is done to avoid making the following description overly redundant and to help one of ordinary skill in the art understand the present disclosure.

In addition, note that the accompanying drawings and the following description are provided to help one of ordinary skill in the art understand the present disclosure fully and should not be construed as limiting the scope of the present disclosure, which is defined by the appended claims.

FIRST TO FOURTH EMBODIMENTS

Zoom lens systems according to first to fourth embodiments will be described on an individual basis with reference to the accompanying drawings.

Note that the zoom lens system according to each of the first to third embodiments includes a first lens group G1, a second lens group G2, and a third lens group G3, a fourth lens group G4, a fifth lens group G5, a sixth lens group G6, and a seventh lens group G7 that constitute following lens groups. A zoom lens system according to the fourth embodiment includes a first lens group G1, a second lens group G2, and a third lens group G3, a fourth lens group G4, a fifth lens group G5, and a sixth lens group G6 that constitute following lens groups.

FIGS. 1, 3, 5, and 7 illustrate lens arrangement diagrams, each showing what state a zoom lens system assumes at an infinity focus point.

In FIGS. 1, 3, 5, and 7, portion (a) illustrates a lens arrangement at the wide-angle end (which is a state with the shortest focal length fW); portion (d) illustrates a lens arrangement at an intermediate position (which is a state with an intermediate focal length fM=√(fW*fT)); and portion (e) illustrates a lens arrangement at the telephoto end (which is a state with the longest focal length fT). Note that portions (a), (d), and (e) of FIGS. 1, 3, 5, and 7 have the same aspect ratio.

Also, in portion (c) of FIGS. 1, 3, 5, and 7, the polygon arrows each connect together the respective positions of the lens groups at the wide-angle end (Wide), intermediate position (Mid), and telephoto end (Tele) from top to bottom. Note that these polygon arrows just connect the wide-angle end to the intermediate position and the intermediate position to the telephoto end with the curves, and do not indicate the actual movement of the lens groups.

Furthermore, in portion (b) of FIGS. 1, 3, 5, and 7, the respective lens groups are designated by the reference signs G1-G6 or G1-G7 corresponding to their respective positions shown in portion (a).

Furthermore, in portion (a) of FIGS. 1, 3, 5, and 7, the asterisk (*) attached to the surface of a particular lens indicates that the surface is an aspheric surface.

Furthermore, the signs (+) and (−) added to the reference signs of the respective lens groups (G1-G6 or G1-G7) in portion (b) of FIGS. 1, 3, 5, and 7 indicate the powers of the respective lens groups. That is to say, the positive sign (+) indicates positive power, and the negative sign (−) indicates negative power. Also, the arrow added to the fifth and sixth lens groups G5, G6 in the first to third embodiments and the arrow added to the fourth and fifth lens groups G4, G5 in the fourth embodiment each indicate, for convenience sake, the direction of movement of the lens groups while the zoom lens system is focusing from the infinity focus point on a close focus point. The specific lenses and lens group to move and the direction of their movement will be described later for each of the exemplary embodiments.

Furthermore, in portions (a), (d), and (e) of FIGS. 1, 3, 5, and 7, the straight line drawn at the right end indicates the position of the image plane S (i.e., a surface, facing the object, of the image sensor). Therefore, the left end of the drawings corresponds to the object side. Furthermore, a parallel plate P such as a low-pass filter or cover glass is arranged between the lens group on the last stage facing the image plane S and the image plane S.

First Embodiment

A zoom lens system according to a first exemplary embodiment will be described with reference to FIG. 1.

FIG. 1 illustrates a lens arrangement diagram of a zoom lens system according to the first exemplary embodiment and its operation.

As shown in FIG. 1, the zoom lens system according to this embodiment includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The third, fourth, fifth, sixth, and seventh lens groups G3, G4, G5, G6, G7 are examples of following lens groups. The first lens group G1, the second lens group G2, the third lens group G3, the fourth lens group G4, the fifth lens group G5, the sixth lens group G6, and the seventh lens groups G7 are arranged in this order such that the first lens group G1 is located closer to an object than any other lens group and that the seventh lens group G7 is located closer to an image than any other lens group.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image than any other member of this first lens group G1.

The second lens group G2 is made up of: a fourth lens L4 having positive power; a fifth lens L5 having negative power; a sixth lens L6 having negative power; a seventh lens L7 having positive power; and an eighth lens L8 having negative power. The fourth lens L4, the fifth lens L5, the sixth lens L6, the seventh lens L7, and the eighth lens L8 are arranged in this order such that the fourth lens L4 is located closer to the object than any other member of this second lens group G2 and that the eighth lens L8 is located closer to the image than any other member of this second lens group G2. The sixth lens L6 and the seventh lens L7 together form a bonded lens when bonded together with an adhesive such as an ultraviolet-curable resin, for example.

The third lens group G3 consists of a ninth lens L9 having positive power.

The fourth lens group G4 is made up of: a tenth lens L10 having positive power; an aperture stop A; an eleventh lens L11 having positive power; a twelfth lens L12 having negative power; a thirteenth lens L13 having negative power; a fourteenth lens L14 having positive power; a fifteenth lens L15 having positive power; a sixteenth lens L16 having negative power; and a seventeenth lens L17 having positive power. The eleventh and twelfth lenses L11, L12 together form a bonded lens when bonded together with an adhesive such as an ultraviolet-curable resin, for example. The thirteenth and fourteenth lenses L13, L14 together form a bonded lens when bonded together with an adhesive such as an ultraviolet-curable resin, for example. The sixteenth and seventeenth lenses L16, L17 together form a bonded lens when bonded together with an adhesive such as an ultraviolet-curable resin, for example.

The fifth lens group G5 is made up of an eighteenth lens L18 having positive power and a nineteenth lens L19 having negative power. The eighteenth and nineteenth lenses L18, L19 together form a bonded lens when bonded together with an adhesive such as an ultraviolet-curable resin, for example. The fifth lens group G5 is an example of a first focus lens group.

The sixth lens group G6 is made up of a twentieth lens L20 having positive power. The sixth lens group G6 is an example of a second focus lens group.

The seventh lens group G7 is made up of a twenty-first lens L21 having negative power and a twenty-second lens L22 having positive power.

The aperture stop A is arranged between the tenth lens L10 and the eleventh lens L11 of the fourth lens group G4.

Next, the lenses that form the respective lens groups in the zoom lens system according to this embodiment will be described.

First of all, the respective lenses that form the first lens group G1 will be described.

The first lens L1 is a meniscus lens with a convex surface facing the object. The second lens L2 is a biconvex lens. The third lens L3 is a meniscus lens with a convex surface facing the object.

Next, the respective lenses that form the second lens group G2 will be described.

The fourth lens L4 is a biconvex lens. The fifth lens L5 is a meniscus lens with a convex surface facing the object. The sixth lens L6 is a biconcave lens. The seventh lens L7 is a biconvex lens. The eighth lens L8 is a biconcave lens.

Next, the respective lenses that form the third lens group G3 will be described.

The ninth lens L9 is a biconvex lens.

Next, the respective lenses that form the fourth lens group G4 will be described.

The tenth lens L10 is a meniscus lens with a convex surface facing the object. The eleventh lens L11 is a meniscus lens with a convex surface facing the image. The twelfth lens L12 is a biconcave lens. The thirteenth lens L13 is a meniscus lens with a convex surface facing the object. The fourteenth lens L14 is a meniscus lens with a convex surface facing the object. The fifteenth lens L15 is a biconvex lens. The sixteenth lens L16 is a meniscus lens with a convex surface facing the image. The seventeenth lens L17 is a meniscus lens with a convex surface facing the image.

Next, the respective lenses that form the fifth lens group G5 will be described.

The eighteenth lens L18 is a meniscus lens with a convex surface facing the image. The nineteenth lens L19 is a biconcave lens.

Next, the respective lenses that form the sixth lens group G6 will be described.

The twentieth lens L20 is a biconvex lens.

Next, the respective lenses that form the seventh lens group G7 will be described.

The twenty-first lens L21 is a biconcave lens. The twenty-second lens L22 is a meniscus lens with a convex surface facing the object.

As can be seen, the zoom lens system according to this embodiment is made up of these seven lens groups.

The respective lens groups that form the zoom lens system according to this embodiment move as indicated by the arrows in portion (c) of FIG. 1 while the zoom lens system is zooming from the wide-angle end (Wide) toward the telephoto end (Tele) during a shooting session.

Specifically, the first lens group G1 is fixed. The second lens group G2 moves from the object toward the image plane S. The third lens group G3 moves toward the object. The aperture stop A and the fourth lens group G4 are fixed together. The fifth lens group G5 moves to draw a locus that is convex toward the image plane S. The sixth lens group G6 moves toward the image plane S. The seventh lens group G7 is fixed. These movements increase the interval between the first lens group G1 and the second lens group G2 and decrease the interval between the second lens group G2 and the third lens group G3 as the zoom lens system is zooming. The interval between the third lens group G3 and the fourth lens group G4 increases. The interval between the fourth lens group G4 and the fifth lens group G5 at the telephoto end increases compared to the wide-angle end. The interval between the fifth lens group G5 and the sixth lens group G6 at the telephoto end increases compared to the wide-angle end. The interval between the sixth lens group G6 and the seventh lens group G7 decreases. The interval between the seventh lens group G7 and the image plane S is fixed.

As can be seen, the respective lens groups move along the optical axis L as indicated by the arrows in portion (c) of FIG. 1. As a result, as shown in portions (a), (d), and (e) of FIG. 1, the respective lens groups are arranged at the wide-angle end, an intermediate position, and the telephoto end.

That is to say, the zoom lens system according to this embodiment moves relatively. In other words, the intervals between the respective lens groups change. This allows a zooming operation to be performed from the wide-angle end through the telephoto end.

Note that the fifth lens group G5 and the sixth lens group G6 that form two focus lens groups move toward the image along the optical axis L and toward the object, respectively, as indicated by the arrows in portion (b) of FIG. 1 while the zoom lens system is focusing from the infinity focus point on a close focus point.

Second Embodiment

A zoom lens system according to a second exemplary embodiment will be described with reference to FIG. 3.

Figure 3:
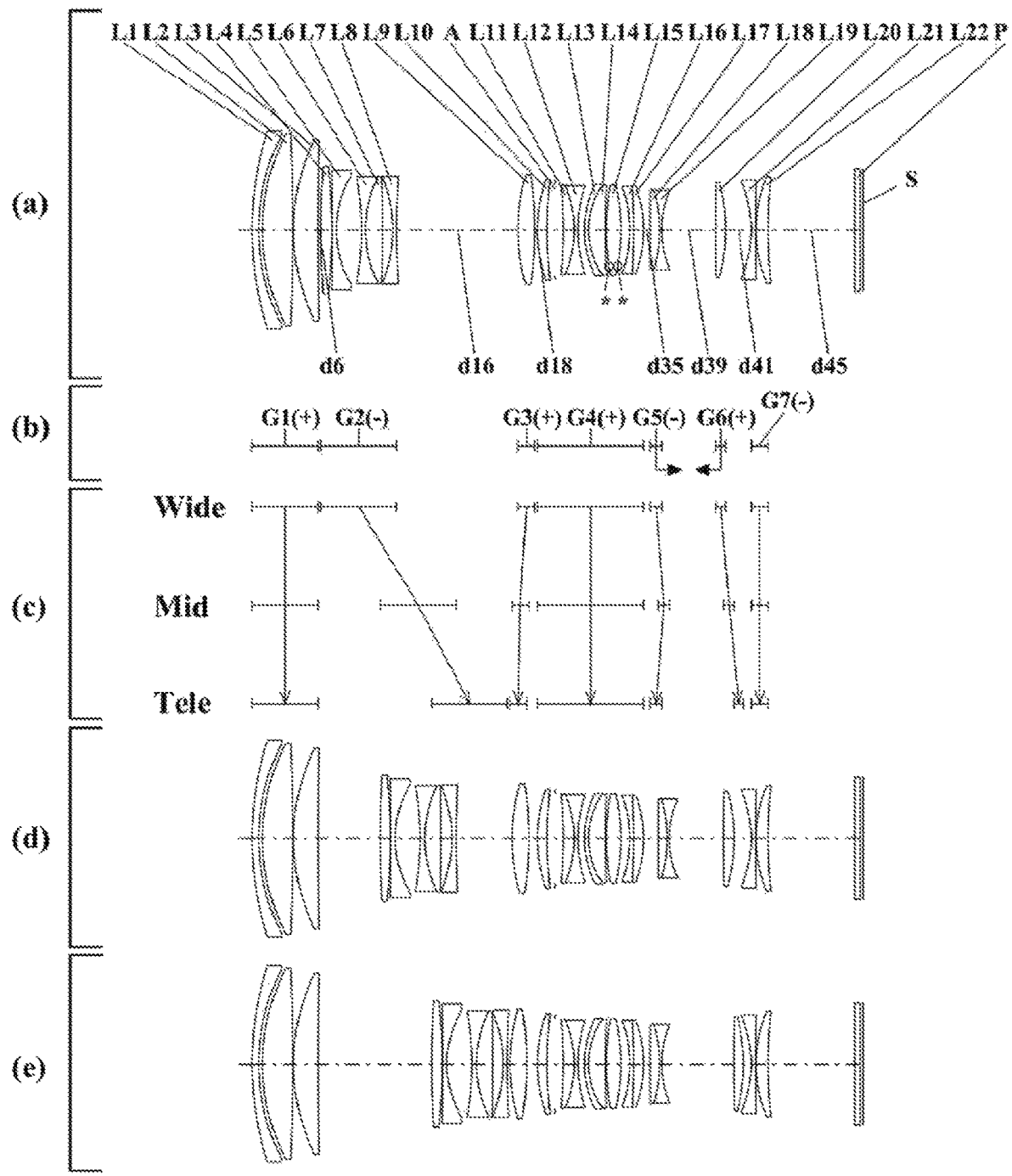
FIG. 3 illustrates lens arrangements showing what state a zoom lens system according to a second embodiment assumes at an infinity focus point.
Figure 4:
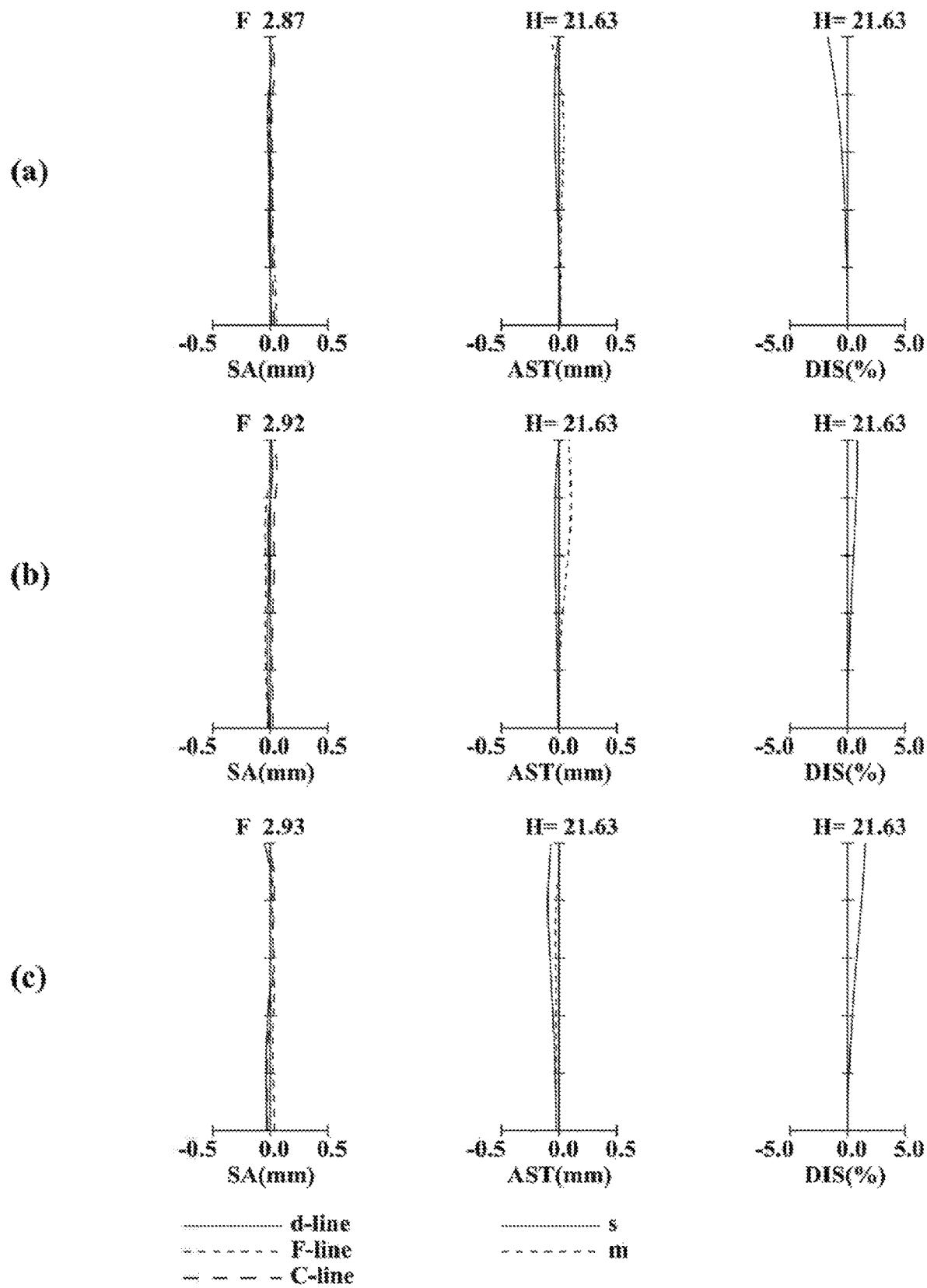
FIG. 4 illustrates longitudinal aberration diagrams showing what state the zoom lens system assumes at the infinity focus point in a second example of numerical values corresponding to the second embodiment.

FIG. 3 illustrates a lens arrangement diagram of a zoom lens system according to the second exemplary embodiment and its operation.

As shown in FIG. 3, the zoom lens system according to this embodiment includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first lens group G1, the second lens group G2, the third lens group G3, the fourth lens group G4, the fifth lens group G5, the sixth lens group G6, and the seventh lens groups G7 are arranged in this order such that the first lens group G1 is located closer to an object than any other lens group and that the seventh lens group G7 is located closer to an image than any other lens group. The third, fourth, fifth, sixth, and seventh lens groups G3, G4, G5, G6, G7 are examples of following lens groups.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image than any other member of this first lens group G1.

The second lens group G2 is made up of: a fourth lens L4 having positive power; a fifth lens L5 having negative power; a sixth lens L6 having negative power; a seventh lens L7 having positive power; and an eighth lens L8 having negative power. The fourth lens L4, the fifth lens L5, the sixth lens L6, the seventh lens L7, and the eighth lens L8 are arranged in this order such that the fourth lens L4 is located closer to the object than any other member of this second lens group G2 and that the eighth lens L8 is located closer to the image than any other member of this second lens group G2. The sixth lens L6 and the seventh lens L7 together form a bonded lens when bonded together with an adhesive such as an ultraviolet-curable resin, for example.

The third lens group G3 consists of a ninth lens L9 having positive power.

The fourth lens group G4 is made up of: a tenth lens L10 having positive power; an aperture stop A; an eleventh lens L11 having positive power; a twelfth lens L12 having negative power; a thirteenth lens L13 having negative power; a fourteenth lens L14 having positive power; a fifteenth lens L15 having positive power; a sixteenth lens L16 having negative power; and a seventeenth lens L17 having positive power. The eleventh and twelfth lenses L11, L12 together form a bonded lens when bonded together with an adhesive such as an ultraviolet-curable resin, for example. The thirteenth and fourteenth lenses L13, L14 together form a bonded lens when bonded together with an adhesive such as an ultraviolet-curable resin, for example. The sixteenth and seventeenth lenses L16, L17 together form a bonded lens when bonded together with an adhesive such as an ultraviolet-curable resin, for example.

The fifth lens group G5 is made up of an eighteenth lens L18 having positive power and a nineteenth lens L19 having negative power. The eighteenth and nineteenth lenses L18, L19 together form a bonded lens when bonded together with an adhesive such as an ultraviolet-curable resin, for example. The fifth lens group G5 is an example of a first focus lens group.

The sixth lens group G6 is made up of a twentieth lens L20 having positive power. The sixth lens group G6 is an example of a second focus lens group.

The seventh lens group G7 is made up of a twenty-first lens L21 having negative power and a twenty-second lens L22 having positive power.

The aperture stop A is arranged between the tenth lens L10 and the eleventh lens L11 of the fourth lens group G4.

Next, the lenses that form the respective lens groups in the zoom lens system according to this embodiment will be described.

First of all, the respective lenses that form the first lens group G1 will be described.

The first lens L1 is a meniscus lens with a convex surface facing the object. The second lens L2 is a biconvex lens. The third lens L3 is a meniscus lens with a convex surface facing the object.

Next, the respective lenses that form the second lens group G2 will be described.

The fourth lens L4 is a biconvex lens. The fifth lens L5 is a biconcave lens. The sixth lens L6 is a biconcave lens. The seventh lens L7 is a biconvex lens. The eighth lens L8 is a biconcave lens.

Next, the respective lenses that form the third lens group G3 will be described.

The ninth lens L9 is a biconvex lens.

Next, the respective lenses that form the fourth lens group G4 will be described.

The tenth lens L10 is a meniscus lens with a convex surface facing the object. The eleventh lens L11 is a meniscus lens with a convex surface facing the image. The twelfth lens L12 is a biconcave lens. The thirteenth lens L13 is a meniscus lens with a convex surface facing the object. The fourteenth lens L14 is a meniscus lens with a convex surface facing the object. The fifteenth lens L15 is a biconvex lens. The sixteenth lens L16 is a meniscus lens with a convex surface facing the image. The seventeenth lens L17 is a meniscus lens with a convex surface facing the image.

Next, the respective lenses that form the fifth lens group G5 will be described.

The eighteenth lens L18 is a biconvex lens. The nineteenth lens L19 is a biconcave lens.

Next, the respective lenses that form the sixth lens group G6 will be described.

The twentieth lens L20 is a biconvex lens.

Next, the respective lenses that form the seventh lens group G7 will be described.

The twenty-first lens L21 is a biconcave lens. The twenty-second lens L22 is a meniscus lens with a convex surface facing the object.

As can be seen, the zoom lens system according to this embodiment is made up of these seven lens groups.

The respective lens groups that form the zoom lens system according to this embodiment move as indicated by the arrows in portion (c) of FIG. 3 while the zoom lens system is zooming from the wide-angle end toward the telephoto end during a shooting session.

Specifically, the first lens group G1 is fixed. The second lens group G2 moves from the object toward the image plane S. The third lens group G3 moves toward the object. The aperture stop A and the fourth lens group G4 are fixed together. The fifth lens group G5 moves to draw a locus that is convex toward the image plane S. The sixth lens group G6 moves toward the image plane S. The seventh lens group G7 is fixed. These movements increase the interval between the first lens group G1 and the second lens group G2 and decrease the interval between the second lens group G2 and the third lens group G3 as the zoom lens system is zooming. The interval between the third lens group G3 and the fourth lens group G4 increases. The interval between the fourth lens group G4 and the fifth lens group G5 remains the same both at the telephoto end and at the wide-angle end. The interval between the fifth lens group G5 and the sixth lens group G6 at the telephoto end increases compared to the wide-angle end. The interval between the sixth lens group G6 and the seventh lens group G7 decreases. The interval between the seventh lens group G7 and the image plane S is fixed.

As can be seen, the respective lens groups move along the optical axis as indicated by the arrows in portion (c) of FIG. 3. As a result, as shown in portions (a), (d), and (e) of FIG. 3, the respective lens groups are arranged at the wide-angle end, an intermediate position, and the telephoto end.

That is to say, the zoom lens system according to this embodiment moves relatively. In other words, the intervals between the respective lens groups change. This allows a zooming operation to be performed from the wide-angle end through the telephoto end.

Note that the fifth lens group G5 and the sixth lens group G6 that form two focus lens groups move toward the image along the optical axis L and toward the object, respectively, as indicated by the arrows in portion (b) of FIG. 3 while the zoom lens system is focusing from the infinity focus point on a close focus point.

Third Embodiment

A zoom lens system according to a third exemplary embodiment will be described with reference to FIG. 5.

Figure 5:
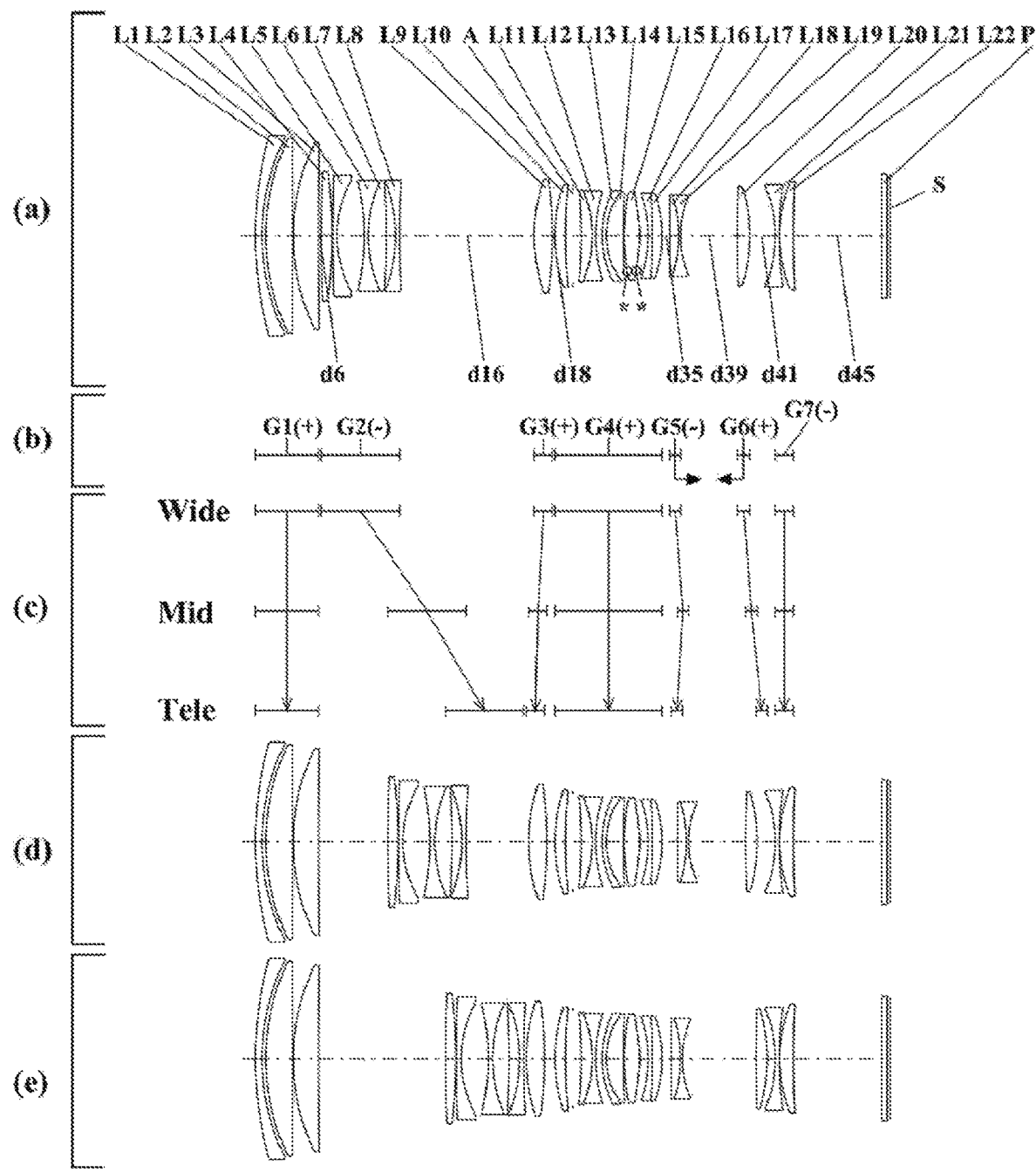
FIG. 5 illustrates lens arrangements showing what state a zoom lens system according to a third embodiment assumes at an infinity focus point.
Figure 6:
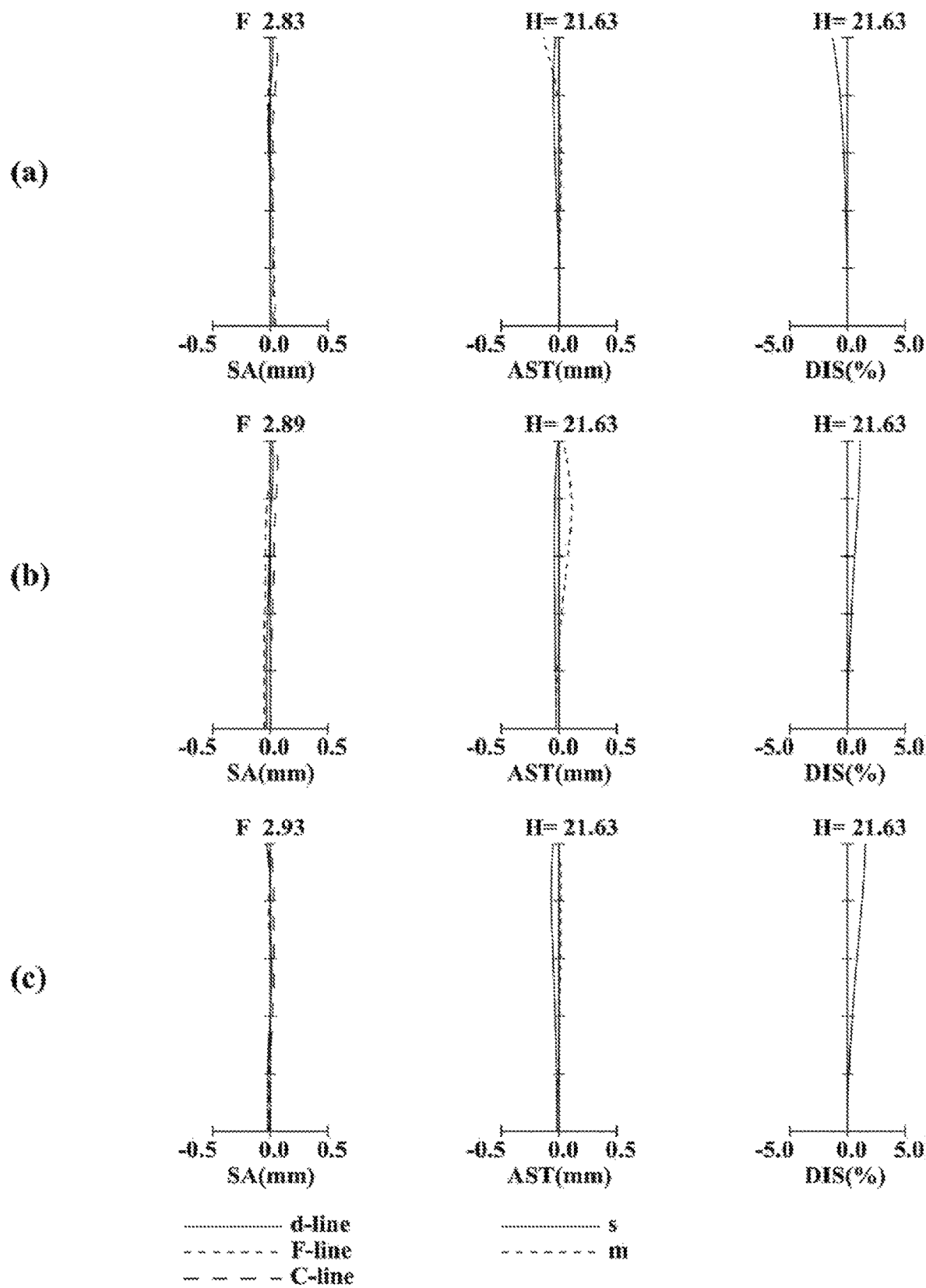
FIG. 6 illustrates longitudinal aberration diagrams showing what state the zoom lens system assumes at the infinity focus point in a third example of numerical values corresponding to the third embodiment.

FIG. 5 illustrates a lens arrangement diagram of a zoom lens system according to the third exemplary embodiment and its operation.

As shown in FIG. 5, the zoom lens system according to this embodiment includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first lens group G1, the second lens group G2, the third lens group G3, the fourth lens group G4, the fifth lens group G5, the sixth lens group G6, and the seventh lens groups G7 are arranged in this order such that the first lens group G1 is located closer to an object than any other lens group and that the seventh lens group G7 is located closer to an image than any other lens group. The third, fourth, fifth, sixth, and seventh lens groups G3, G4, G5, G6, G7 are examples of following lens groups.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image than any other member of this first lens group G1.

The second lens group G2 is made up of: a fourth lens L4 having positive power; a fifth lens L5 having negative power; a sixth lens L6 having negative power; a seventh lens L7 having positive power; and an eighth lens L8 having negative power. The fourth lens L4, the fifth lens L5, the sixth lens L6, the seventh lens L7, and the eighth lens L8 are arranged in this order such that the fourth lens L4 is located closer to the object than any other member of this second lens group G2 and that the eighth lens L8 is located closer to the image than any other member of this second lens group G2. The sixth lens L6 and the seventh lens L7 together form a bonded lens when bonded together with an adhesive such as an ultraviolet-curable resin, for example.

The third lens group G3 consists of a ninth lens L9 having positive power.

The fourth lens group G4 is made up of: a tenth lens L10 having positive power; an aperture stop A; an eleventh lens L11 having positive power; a twelfth lens L12 having negative power; a thirteenth lens L13 having negative power; a fourteenth lens L14 having positive power; a fifteenth lens L15 having positive power; a sixteenth lens L16 having negative power; and a seventeenth lens L17 having positive power. The eleventh and twelfth lenses L11, L12 together form a bonded lens when bonded together with an adhesive such as an ultraviolet-curable resin, for example. The thirteenth and fourteenth lenses L13, L14 together form a bonded lens when bonded together with an adhesive such as an ultraviolet-curable resin, for example. The sixteenth and seventeenth lenses L16, L17 together form a bonded lens when bonded together with an adhesive such as an ultraviolet-curable resin, for example.

The fifth lens group G5 is made up of an eighteenth lens L18 having positive power and a nineteenth lens L19 having negative power. The eighteenth and nineteenth lenses L18, L19 together form a bonded lens when bonded together with an adhesive such as an ultraviolet-curable resin, for example. The fifth lens group G5 is an example of a first focus lens group.

The sixth lens group G6 is made up of a twentieth lens L20 having positive power. The sixth lens group G6 is an example of a second focus lens group.

The seventh lens group G7 is made up of a twenty-first lens L21 having negative power and a twenty-second lens L22 having positive power.

The aperture stop A is arranged between the tenth lens L10 and the eleventh lens L11 of the fourth lens group G4.

Next, the lenses that form the respective lens groups in the zoom lens system according to this embodiment will be described.

First of all, the respective lenses that form the first lens group G1 will be described.

The first lens L1 is a meniscus lens with a convex surface facing the object. The second lens L2 is a planoconvex lens with a convex surface facing the object. The third lens L3 is a meniscus lens with a convex surface facing the object.

Next, the respective lenses that form the second lens group G2 will be described.

The fourth lens L4 is a biconvex lens. The fifth lens L5 is a meniscus lens with a convex surface facing the object. The sixth lens L6 is a biconcave lens. The seventh lens L7 is a biconvex lens. The eighth lens L8 is a biconcave lens.

Next, the respective lenses that form the third lens group G3 will be described.

The ninth lens L9 is a biconvex lens.

Next, the respective lenses that form the fourth lens group G4 will be described.

The tenth lens L10 is a meniscus lens with a convex surface facing the object. The eleventh lens L11 is a meniscus lens with a convex surface facing the image. The twelfth lens L12 is a biconcave lens. The thirteenth lens L13 is a meniscus lens with a convex surface facing the object. The fourteenth lens L14 is a meniscus lens with a convex surface facing the object. The fifteenth lens L15 is a biconvex lens. The sixteenth lens L16 is a meniscus lens with a convex surface facing the image. The seventeenth lens L17 is a meniscus lens with a convex surface facing the image.

Next, the respective lenses that form the fifth lens group G5 will be described.

The eighteenth lens L18 is a planoconvex lens with a convex surface facing the image plane S. The nineteenth lens L19 is a biconcave lens.

Next, the respective lenses that form the sixth lens group G6 will be described.

The twentieth lens L20 is a biconvex lens.

Next, the respective lenses that form the seventh lens group G7 will be described.

The twenty-first lens L21 is a biconcave lens. The twenty-second lens L22 is a meniscus lens with a convex surface facing the object.

As can be seen, the zoom lens system according to this embodiment is made up of these seven lens groups.

The respective lens groups that form the zoom lens system according to this embodiment move as indicated by the arrows in portion (c) of FIG. 5 while the zoom lens system is zooming from the wide-angle end toward the telephoto end during a shooting session.

Specifically, the first lens group G1 is fixed. The second lens group G2 moves from the object toward the image plane S. The third lens group G3 moves toward the object. The aperture stop A and the fourth lens group G4 are fixed together. The fifth lens group G5 moves to draw a locus that is convex toward the image plane S. The sixth lens group G6 moves toward the image plane S. The seventh lens group G7 is fixed. These movements increase the interval between the first lens group G1 and the second lens group G2 and decrease the interval between the second lens group G2 and the third lens group G3 as the zoom lens system is zooming. The interval between the third lens group G3 and the fourth lens group G4 increases. The interval between the fourth lens group G4 and the fifth lens group G5 at the telephoto end increases compared to the wide-angle end. The interval between the fifth lens group G5 and the sixth lens group G6 at the telephoto end increases compared to the wide-angle end. The interval between the sixth lens group G6 and the seventh lens group G7 decreases. The interval between the seventh lens group G7 and the image plane S is fixed.

As can be seen, the respective lens groups move along the optical axis L as indicated by the arrows in portion (c) of FIG. 5. As a result, as shown in portions (a), (d), and (e) of FIG. 5, the respective lens groups are arranged at the wide-angle end, an intermediate position, and the telephoto end.

That is to say, the zoom lens system according to this embodiment moves relatively. In other words, the intervals between the respective lens groups change. This allows a zooming operation to be performed from the wide-angle end through the telephoto end.

Note that the fifth lens group G5 and the sixth lens group G6 that form two focus lens groups move toward the image along the optical axis L and toward the object, respectively, as indicated by the arrows in portion (b) of FIG. 5 while the zoom lens system is focusing from the infinity focus point on a close focus point.

Fourth Embodiment

A zoom lens system according to a fourth exemplary embodiment will be described with reference to FIG. 7.

Figure 7:
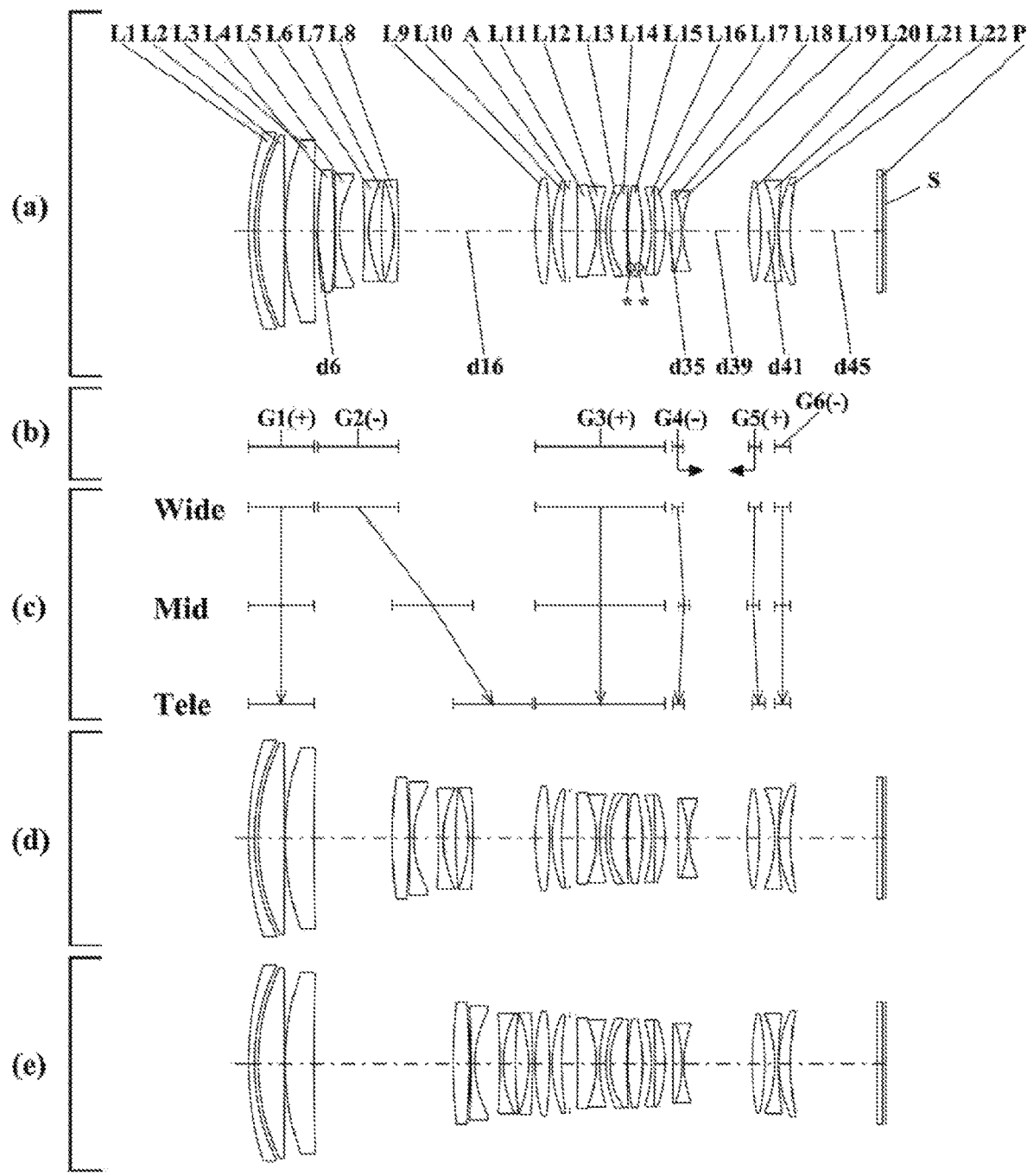
FIG. 7 illustrates lens arrangements showing what state a zoom lens system according to a fourth embodiment assumes at an infinity focus point.
Figure 8:
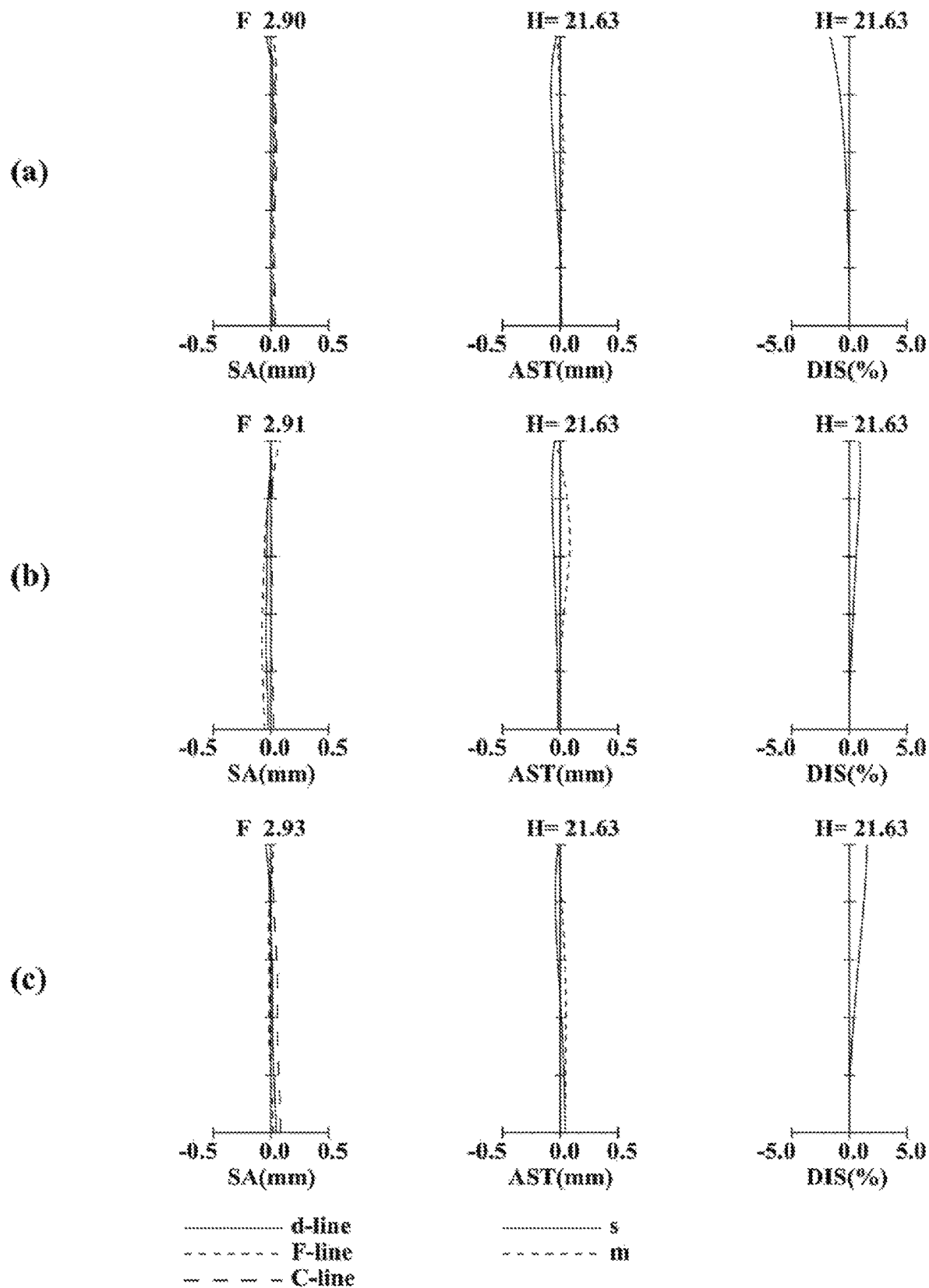
FIG. 8 illustrates longitudinal aberration diagrams showing what state the zoom lens system assumes at the infinity focus point in a fourth example of numerical values corresponding to the fourth embodiment.

FIG. 7 illustrates a lens arrangement diagram of a zoom lens system according to the fourth exemplary embodiment and its operation.

As shown in FIG. 7, the zoom lens system according to this embodiment includes: a first lens group G1 having positive power; a second lens group G2 having negative power; a third lens group G3 having positive power; a fourth lens group G4 having negative power; a fifth lens group G5 having positive power; and a sixth lens group G6 having negative power. The first lens group G1, the second lens group G2, the third lens group G3, the fourth lens group G4, the fifth lens group G5, and the sixth lens group G6 are arranged in this order such that the first lens group G1 is located closer to an object than any other lens group and that the sixth lens group G6 is located closer to an image than any other lens group. The third, fourth, fifth, and sixth lens groups G3, G4, G5, G6 are examples of following lens groups.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image than any other member of this first lens group G1.

The second lens group G2 is made up of: a fourth lens L4 having positive power; a fifth lens L5 having negative power; a sixth lens L6 having negative power; a seventh lens L7 having positive power; and an eighth lens L8 having negative power. The fourth lens L4, the fifth lens L5, the sixth lens L6, the seventh lens L7, and the eighth lens L8 are arranged in this order such that the fourth lens L4 is located closer to the object than any other member of this second lens group G2 and that the eighth lens L8 is located closer to the image than any other member of this second lens group G2. The sixth lens L6 and the seventh lens L7 together form a bonded lens when bonded together with an adhesive such as an ultraviolet-curable resin, for example.

The third lens group G3 is made up of: a ninth lens L9 having positive power; a tenth lens L10 having positive power; an aperture stop A; an eleventh lens L11 having positive power; a twelfth lens L12 having negative power; a thirteenth lens L13 having negative power; a fourteenth lens L14 having positive power; a fifteenth lens L15 having positive power; a sixteenth lens L16 having negative power; and a seventeenth lens L14 having positive power. The eleventh lens L11 and the twelfth lens L12 together form a bonded lens when bonded together with an adhesive such as an ultraviolet-curable resin, for example. The thirteenth lens L13 and the fourteenth lens L14 together form a bonded lens when bonded together with an adhesive such as an ultraviolet-curable resin, for example. The sixteenth lens L16 and the seventeenth lens L17 together form a bonded lens when bonded together with an adhesive such as an ultraviolet-curable resin, for example.

The fourth lens group G4 is made up of an eighteenth lens L18 having positive power and a nineteenth lens L19 having negative power. The eighteenth and nineteenth lenses L18, L19 together form a bonded lens when bonded together with an adhesive such as an ultraviolet-curable resin, for example. The fourth lens group G4 is an example of a first focus lens group.

The fifth lens group G5 is made up of a twentieth lens L20 having positive power. The fifth lens group G5 is an example of a second focus lens group.

The sixth lens group G6 is made up of a twenty-first lens L21 having negative power and a twenty-second lens L22 having positive power.

The aperture stop A is arranged between the tenth lens L10 and the eleventh lens L11 of the third lens group G3.

Next, the lenses that form the respective lens groups in the zoom lens system according to this embodiment will be described.

First of all, the respective lenses that form the first lens group G1 will be described.

The first lens L1 is a meniscus lens with a convex surface facing the object. The second lens L2 is a biconvex lens. The third lens L3 is a meniscus lens with a convex surface facing the object.

Next, the respective lenses that form the second lens group G2 will be described.

The fourth lens L4 is a biconvex lens. The fifth lens L5 is a biconcave lens. The sixth lens L6 is a biconcave lens. The seventh lens L7 is a meniscus lens with a convex surface facing the object. The eighth lens L8 is a meniscus lens with a convex surface facing the image.

Next, the respective lenses that form the third lens group G3 will be described.

The ninth lens L9 is a biconvex lens. The tenth lens L10 is a meniscus lens with a convex surface facing the object. The eleventh lens L11 is a meniscus lens with a convex surface facing the image. The twelfth lens L12 is a biconcave lens. The thirteenth lens L13 is a meniscus lens with a convex surface facing the object. The fourteenth lens L14 is a meniscus lens with a convex surface facing the object. The fifteenth lens L15 is a biconvex lens. The sixteenth lens L16 is a meniscus lens with a convex surface facing the image. The seventeenth lens L17 is a meniscus lens with a convex surface facing the image.

Next, the respective lenses that form the fourth lens group G4 will be described.

The eighteenth lens L18 is a meniscus lens with a convex surface facing the image. The nineteenth lens L19 is a biconcave lens.

Next, the respective lenses that form the fifth lens group G5 will be described.

The twentieth lens L20 is a biconvex lens.

Next, the respective lenses that form the sixth lens group G6 will be described.

The twenty-first lens L21 is a biconcave lens. The twenty-second lens L22 is a meniscus lens with a convex surface facing the object.

As can be seen, the zoom lens system according to this embodiment is made up of these six lens groups.

The respective lens groups that form the zoom lens system according to this embodiment move as indicated by the arrows in portion (c) of FIG. 7 while the zoom lens system is zooming from the wide-angle end toward the telephoto end during a shooting session.

Specifically, the first lens group G1 is fixed. The second lens group G2 moves from the object toward the image plane S. The aperture stop A and the third lens group G3 are fixed together. The fourth lens group G4 moves to draw a locus that is convex toward the image plane S. The fifth lens group G5 moves to draw a locus that is convex toward the object. The sixth lens group G6 is fixed. These movements increase the interval between the first lens group G1 and the second lens group G2 and decrease the interval between the second lens group G2 and the third lens group G3 as the zoom lens system is zooming. The interval between the third lens group G3 and the fourth lens group G4 at the telephoto end increases compared to the wide-angle end. The interval between the fourth lens group G4 and the fifth lens group G5 at the telephoto end increases compared to the wide-angle end. The interval between the fifth lens group G5 and the sixth lens group G6 at the telephoto end decreases compared to the wide-angle end. The interval between the sixth lens group G6 and the image plane S is fixed.

As can be seen, the respective lens groups move along the optical axis L as indicated by the arrows in portion (c) of FIG. 7. As a result, as shown in portions (a), (d), and (e) of FIG. 7, the respective lens groups are arranged at the wide-angle end, an intermediate position, and the telephoto end.

That is to say, the zoom lens system according to this embodiment moves relatively. In other words, the intervals between the respective lens groups change. This allows a zooming operation to be performed from the wide-angle end through the telephoto end.

Note that the fourth lens group G4 and the fifth lens group G5 that form two focus lens groups move toward the image along the optical axis L and toward the object, respectively, as indicated by the arrows in portion (b) of FIG. 7 while the zoom lens system is focusing from the infinity focus point on a close focus point.

(Conditions and Advantages)

Next, conditions for implementing the zoom lens systems according to the first, second, third, and fourth embodiments will be described.

That is to say, a plurality of possible conditions are defined for the zoom lens system according to each of these four embodiments. In that case, a zoom lens system, of which the configuration satisfies all of these possible conditions, is most advantageous.

Alternatively, a zoom lens system that achieves its expected advantages by satisfying the individual conditions to be described below may also be obtained.

For example, the zoom lens systems according to the first, second, third, and fourth embodiments each include the first lens group having positive power, the second lens group having negative power, and following lens groups. The first, second, and following lens groups are arranged in this order such that the first lens group is located closer to an object than any other lens group and that the following lens groups are located closer to an image than any other lens group. The following lens groups include: a first focus lens group having negative power; and a second focus lens group having positive power, arranged adjacent to, and closer to the image than, the first focus lens group. The first and second focus lens groups move along an optical axis while the zoom lens system is focusing from an infinity focus point on a close focus point. While the zoom lens system is zooming from a wide-angle end toward a telephoto end, intervals between respective lens groups change while the first lens group is fixed with respect to an image plane.

The zoom lens system suitably satisfies the condition expressed by the following Inequality (1), for example:

$$-0.23 < f2/TTL < -0.15 \quad (1)$$

where TTL is an optical total length at the telephoto end and f2 is a focal length of the second lens group.

That is to say, the Inequality (1) expresses a condition defining the focal length of the second lens group with respect to the optical total length.

Making the f2/TTL ratio satisfy the Inequality (1) reduces the degrees of aberrations produced while shortening the total length. If the f2/TTL ratio were less than −0.23 that is the lower limit value of the Inequality (1), then the second lens group would need to go a longer distance, thus increasing the overall size of the lens system, which is not advantageous. Meanwhile, if the f2/TTL ratio were greater than −0.15 that is the upper limit value of the Inequality (1), then it would be difficult to compensate for various types of aberrations, which is not beneficial, either.

At this time, the zoom lens system more suitably satisfies one of the two conditions expressed by the following Inequalities (1a) and (1b):

$$-0.22 < f2/TTL \quad (1a)$$

$$f2/TTL < -0.17 \quad (1b)$$

This enhances the advantages described above.

Also, the zoom lens system even more suitably satisfies the condition expressed by the following Inequality (1c):

$$f2/TTL < -0.18 \quad (1c)$$

This enhances the advantages described above.

Also, the zoom lens system suitably satisfies the condition expressed by the following Inequality (2), for example:

$$-3.2 < (1-\beta1\times\beta1)\times(\beta2\times\beta2) < -2.4 \quad (2)$$

where β1 is a lateral magnification at the telephoto end of the first focus lens group and β2 is a lateral magnification at the telephoto end of an optical system located closer to the image than the first focus lens group is.

That is to say, the Inequality (2) expresses a condition defining a focus position sensitivity of the first focus lens group.

If (1−β1×β1)×(β2×β2) were less than −3.2 that is the lower limit value of the Inequality (2), the position sensitivity of the focus lens group would increase so much as to make it difficult to control the focus lens group, which is not advantageous.

Meanwhile, if (1−β1×β1)×(β2×β2) were greater than −2.4 that is the upper limit value of the Inequality (2), then the focus lens group would need to go a longer distance, thus increasing the overall size of the lens system, which is not advantageous.

At this time, the zoom lens system more suitably satisfies one of the two conditions expressed by the following Inequalities (2a) and (2b):

$$-3.10 < (1-\beta1\times\beta1)\times(\beta2\times\beta2) \quad (2a)$$

$$(1-\beta1\times\beta1)\times(\beta2\times\beta2) < -2.45 \quad (2b)$$

This enhances the advantages described above.

Also, the zoom lens system even more suitably satisfies one of the two conditions expressed by the following Inequalities (2c) and (2d):

$$-3.0 < (1-\beta1\times\beta1)\times(\beta2\times\beta2) \quad (2c)$$

$$(1-\beta1\times\beta1)\times(\beta2\times\beta2) < -2.50 \quad (2d)$$

This enhances the advantages described above.

Furthermore, for example, the first focus lens group suitably includes a lens having positive power and a lens having negative power, while the second focus lens group suitably consists of a single lens having positive power.

Providing the first focus lens group with a lens having positive power and a lens having negative power reduces the axial chromatic aberration involved with focus shifting. Forming the second focus lens group of a single lens contributes to lightening the weight of the focus lens group.

Also, for example, the following lens groups suitably include an aperture stop. A lens located adjacent to, and closer to the object than, the aperture stop and a lens located adjacent to, and closer to the image than, the aperture stop suitably have positive power, and satisfy the following Inequalities (3) and (4):

$$vd1 > 65 \quad (3)$$

$$vd2 > 65 \quad (4)$$

where vd1 is an abbe number of the lens located adjacent to, and closer to the object than, the aperture stop and vd2 is an abbe number of the lens located adjacent to, and closer to the image than, the aperture stop.

Setting the abbe number of the lens located adjacent to, and closer to the object than, the aperture stop at 65 (i.e., the lower limit value of the Inequality (3)) or less and setting the abbe number of the lens located adjacent to, and closer to the image than, the aperture stop at 65 (i.e., the lower limit value of the Inequality (3)) or less would increase the chromatic aberration of magnification over the entire zoom range too significantly to ensure good performance.

At this time, the lenses more suitably satisfy one of the two conditions expressed by the following Inequalities (3a) and (4a):

$$vd1 > 75 \quad (3a)$$

$$vd2 > 75 \quad (4a)$$

This enhances the advantages described above.

Furthermore, the lenses even more suitably satisfy one of the two conditions expressed by the following Inequalities (3b) and (4b):

$$vd1 > 80 \quad (3b)$$

$$vd2 > 80 \quad (4b)$$

This enhances the advantages described above.

(Schematic configuration for image capture device to which first embodiment is applied)

Next, a schematic configuration for an image capture device, to which the zoom lens system of the first embodiment is applied, will be described with reference to FIG. 9.

Figure 9:
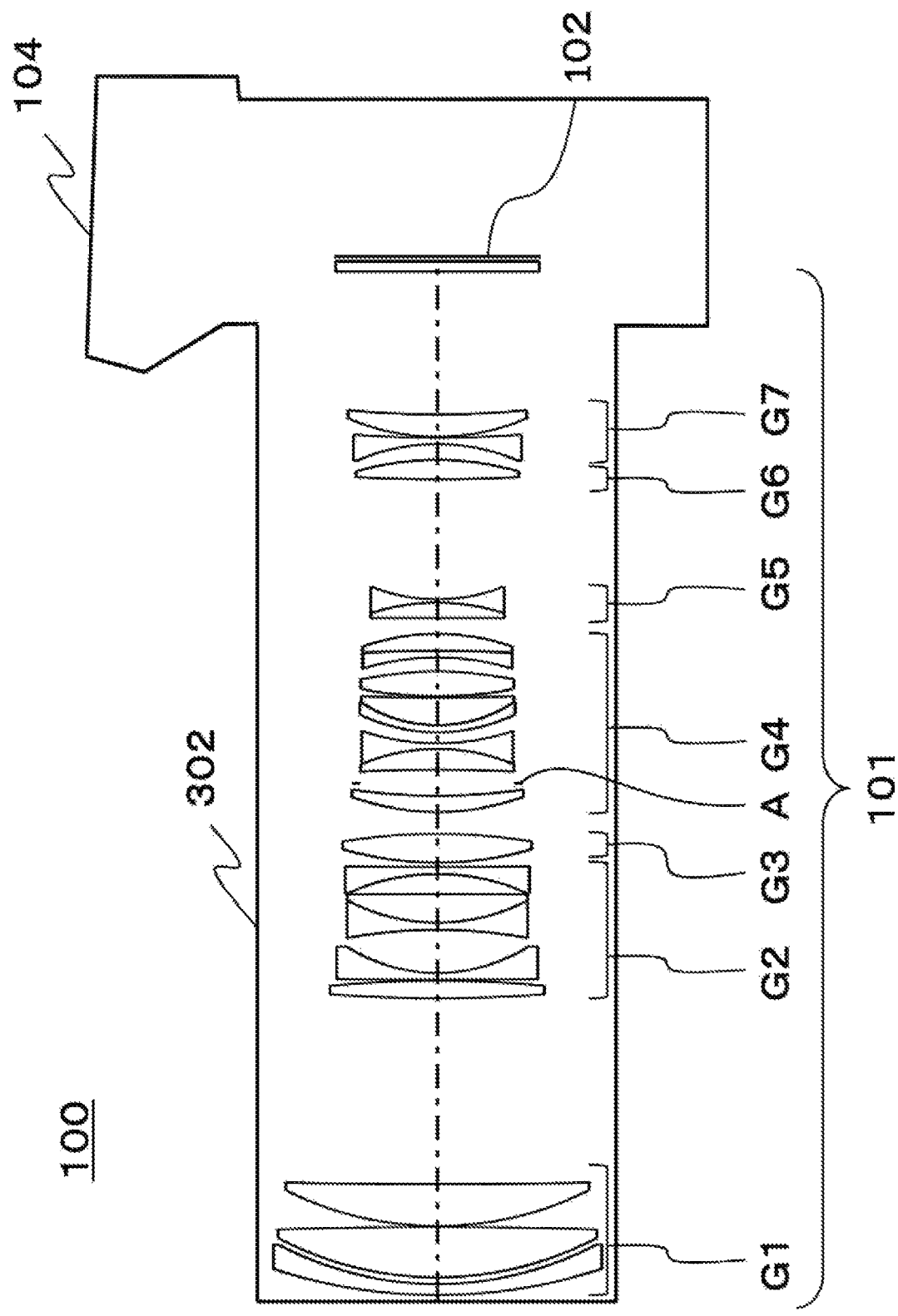
FIG. 9 illustrates a schematic configuration for an image capture device including the zoom lens system according to the first embodiment.

FIG. 9 schematically illustrates a configuration for an image capture device including the zoom lens system of the first embodiment described above. In the example illustrated in FIG. 9, the zoom lens system of the first embodiment is applied to an image capture device. However, the same advantage may be achieved even by applying the zoom lens system of the second, third, or fourth embodiment described above to the image capture device.

As shown in FIG. 9, the image capture device 100 includes a housing 104 and a lens barrel 302 connected to the housing 104. An image sensor 102 is housed in the housing 104. The zoom lens system 101 is housed in the lens barrel 302. The image capture device 100 may be implemented as a digital camera, for example.

The zoom lens system 101 includes the first lens group G1, the second lens group G2, the third lens group G3, the aperture stop A, the fourth lens group G4, the fifth lens group G5, the sixth lens group G6, and the seventh lens group G7, all of which are housed in the lens barrel 302.

The lens barrel 302 holds the respective lens groups and the aperture stop A that form the zoom lens system 101.

The image sensor 102 is arranged at the image plane S of the zoom lens system according to this embodiment.

In addition, an actuator, a lens frame, and other members are also housed in the housing 104. The respective lens groups, the aperture stop A, and other members that form the zoom lens system 101 are attached or fitted to the actuator and the lens frame so as to be movable during the zooming operation.

The image capture device 100 has such a configuration. This provides an image capture device 100 in which various types of aberrations have been compensated for sufficiently.

In the example described above, the zoom lens system is applied to a digital camera. However, this is only an example and should not be construed as limiting. Alternatively, the zoom lens system is also applicable to a different type of image capture device such as a surveillance camera or a smartphone.

(Schematic Configuration for Camera System to which First Embodiment is Applied)

Next, a schematic configuration for a camera system, to which the zoom lens system of the first embodiment is applied, will be described with reference to FIG. 10.

Figure 10:
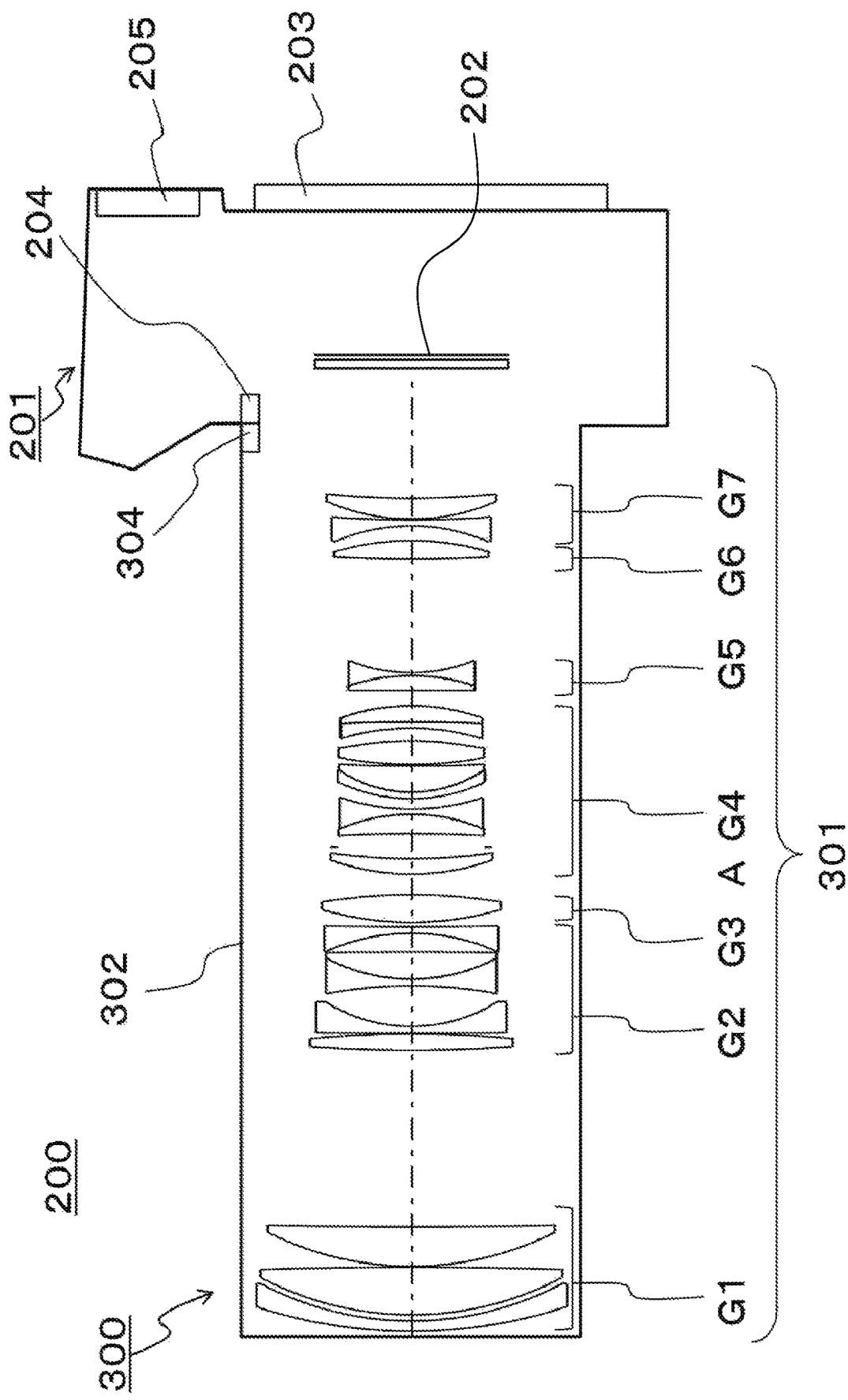
FIG. 10 illustrates a schematic configuration for a camera system including the zoom lens system according to the first embodiment.

FIG. 10 schematically illustrates a configuration for a camera system including the zoom lens system of the first embodiment described above. In the example illustrated in FIG. 10, the zoom lens system of the first embodiment is applied to a camera system. However, the same advantage may be achieved even by applying the zoom lens system of the second, third, or fourth embodiment described above to the camera system. The camera system 200 may be implemented as a digital camera system, of which the lens is interchangeable, for example.

As shown in FIG. 10, the camera system 200 includes a camera body 201 and an interchangeable lens unit 300 to be connected removably to the camera body 201.

The camera body 201 includes an image sensor 202, a monitor 203, a memory (not shown) to store an image signal, a camera mount 204, and a viewfinder 205. The image sensor 202 may be implemented as a CMOS image sensor, for example, and receives an optical image formed by the zoom lens system of the interchangeable lens unit 300 and transforms the optical image into an electrical image signal. The monitor 203 may be implemented as an LCD, for example, and displays the image signal transformed by the image sensor 202.

The interchangeable lens unit 300 includes the zoom lens system 301 including the first lens group G1, the second lens group G2, the third lens group G3, the fourth lens group G4, the aperture stop A, the fifth lens group G5, the sixth lens group G6, and the seventh lens group G7.

The lens barrel 302 holds the respective lens groups and aperture stop A of the zoom lens system 301. The lens barrel 302 further includes a lens mount 304 to be connected to the camera mount 204 of the camera body 201.

The camera mount 204 of the camera body 201 and the lens mount 304 of the lens barrel 302 are physically connected together with a bayonet mechanism, for example. In addition, a controller (not shown) in the camera body 201 and a controller (not shown) in the interchangeable lens unit 300 are electrically connected together. That is to say, the camera mount 204 and the lens mount 304 serve as interfaces that allow the camera mount 204 and the lens mount 304 to exchange signals with each other.

The zoom lens system 301 includes the respective lens group held in the lens barrel 302 of the interchangeable lens unit 300 and the parallel plate P in the camera body 201.

The actuator, the lens frame, and other members to be controlled by the controller are housed in the zoom lens system 301. To the actuator and the lens frame, the respective lens groups, the aperture stop A, and other members that form the zoom lens system 301 are attached or fitted so as to be movable during the zooming operation.

The camera system 200 may have such a configuration. This provides a camera system 200 in which various types of aberrations have been compensated for sufficiently.

Other Embodiments

The first, second, third, and fourth embodiments have been described as exemplary embodiments of the present disclosure.

Note that the embodiments described above are only examples of the present disclosure and should not be construed as limiting. Rather, each of those embodiments may be readily modified, replaced, combined with other embodiments, or partially omitted without departing from the scope of the present disclosure.

For example, in the first to fourth embodiments described above, the zoom lens system is supposed to be used in the entire zoom range from the wide-angle end through the telephoto end. However, the zoom lens system does not have to be used in the entire zoom range. Alternatively, the zoom lens system may also be used selectively only in an extracted range where optical performance is ensured according to the desired zoom range. That is to say, the zoom lens system may also be used as a zoom lens system with lower zoom power than the zoom lens system to be described for the first, second, third, and fourth examples of numerical values corresponding to the first, second, third, and fourth embodiments, respectively. Optionally, the zoom lens system may also be used selectively as single-focus lens system only at an extracted focal length where optical performance is ensured according to the desired zoom position.

Furthermore, in the first to fourth embodiments described above, each of the lens groups that form the zoom lens system is supposed to consist of only refractive lenses that deflect the incoming light ray through refraction (i.e., lenses of the type that deflects the incoming light ray at the interface between two media with mutually different refractive indices). However, this is only an example and should not be construed as limiting. Alternatively, each lens group may also include diffractive lenses that deflect the incoming light ray through diffraction and/or refractive-diffractive hybrid lenses that deflect the incoming light ray through a combination of diffraction and refraction actions. Still alternatively, each lens group may also be made up of refractive index distributed lenses that deflect the incoming light ray in accordance with the distribution of refractive indices in the medium. Among other things, a diffraction structure is suitably formed at the interface between two media with mutually different refractive indices in the refractive-diffractive hybrid lens, because the diffraction efficiency would depend on the wavelength much less heavily in that case. Optionally, an optical aberration such as a chromatic aberration of magnification may also be compensated for by the camera body as well. This provides a camera system in which various types of aberrations have been compensated for sufficiently over the entire zoom range and which has excellent close-up shooting capability.

EXAMPLES OF NUMERICAL VALUES

Next, exemplary sets of specific numerical values that were actually adopted in the zoom lens systems with the configurations according to the first, second, third, and fourth embodiments will be described with reference to FIGS. 2, 4, 6, and 8.

Note that in the tables showing these exemplary sets of numerical values, the length is expressed in millimeters (mm), the angle of view is expressed in degrees (°), r indicates the radius of curvature, d indicates the surface interval, nd indicates a refractive index with respect to a d-line, vd (also denoted as "vd") indicates an abbe number with respect to a d-line, and a surface with an asterisk (*) is an aspheric surface. The aspheric shape is defined by the following equation:

$$Z = \frac{h^2/r}{1 + \sqrt{1-(1+k)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 4, 6, and 8 are longitudinal aberration diagrams showing what state the zoom lens systems according to the first, second, third, and fourth examples of numerical values corresponding to the first, second, third, and fourth embodiments, respectively, assume at the infinity focus point.

In each longitudinal aberration diagram, portion (a) shows the longitudinal aberrations at the wide-angle end, portion (b) shows the longitudinal aberrations at the intermediate position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right.

In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the zoom lens system corresponding to the first embodiment shown in FIG. 1. Specifically, as the first example of numerical values, surface data is shown in Table 1, aspheric surface data is shown in Table 2, and various types of data at the infinity focus point are shown in Tables 3A-3D:

TABLE 1

Surface data

| Surface No. | r | d | nd | vd |
|---|---|---|---|---|
| Object surface | ∞ | | | |
| 1 | 113.88640 | 2.40000 | 1.90366 | 31.3 |
| 2 | 73.34300 | 1.40000 | | |
| 3 | 73.26970 | 10.93870 | 1.43700 | 95.1 |
| 4 | −1099.60980 | 0.20000 | | |
| 5 | 73.01210 | 9.06240 | 1.43700 | 95.1 |
| 6 | 1427.78470 | Variable | | |
| 7 | 325.23860 | 3.81730 | 1.75520 | 27.5 |
| 8 | −237.64580 | 0.20000 | | |
| 9 | 1883.85250 | 1.50000 | 1.70154 | 41.1 |
| 10 | 36.62590 | 9.35040 | | |
| 11 | −106.80870 | 1.50000 | 1.49700 | 81.6 |
| 12 | 41.55010 | 0.01000 | 1.56732 | 42.8 |
| 13 | 41.55010 | 6.19030 | 1.90366 | 31.3 |
| 14 | −2919.09450 | 4.34720 | | |
| 15 | −47.29410 | 1.50000 | 1.62299 | 58.1 |
| 16 | 1090.46650 | Variable | | |
| 17 | 72.89840 | 6.20430 | 1.83400 | 37.3 |
| 18 | −125.91930 | Variable | | |
| 19 | 54.15970 | 3.50000 | 1.49700 | 81.6 |
| 20 | 129.18630 | 2.70000 | | |
| 21 (aperture) | ∞ | 3.00000 | | |
| 22 | −306.68430 | 4.46560 | 1.43700 | 95.1 |
| 23 | −41.65960 | 0.01000 | 1.56732 | 42.8 |
| 24 | −41.65960 | 1.20000 | 1.84666 | 23.8 |
| 25 | 50.74240 | 2.40000 | | |
| 26 | 38.51610 | 1.50000 | 1.84666 | 23.8 |
| 27 | 29.55610 | 0.01000 | 1.56732 | 42.8 |
| 28 | 29.55610 | 6.00000 | 1.49700 | 81.6 |
| 29 | 446.83420 | 0.30000 | | |
| 30* | 85.84360 | 5.40000 | 1.58699 | 59.5 |
| 31* | −66.56740 | 3.00000 | | |
| 32 | −55.00390 | 1.40000 | 1.58144 | 40.9 |
| 33 | −317.62630 | 0.01000 | 1.56732 | 42.8 |
| 34 | −317.62630 | 3.70000 | 1.84666 | 23.8 |
| 35 | −47.99260 | Variable | | |
| 36 | −3242.45700 | 3.30340 | 1.86966 | 20.0 |
| 37 | −45.68510 | 0.01000 | 1.56732 | 42.8 |
| 38 | −45.68510 | 0.70000 | 1.70154 | 41.1 |
| 39 | 37.66840 | Variable | | |
| 40 | 328.89510 | 4.21710 | 1.72825 | 28.3 |
| 41 | −62.10320 | Variable | | |
| 42 | −44.10590 | 1.40000 | 1.84666 | 23.8 |
| 43 | 238.35540 | 0.20000 | | |
| 44 | 47.99790 | 4.81740 | 1.65844 | 50.9 |
| 45 | 198.71610 | 31.00000 | | |
| 46 | ∞ | 2.10000 | 1.51680 | 64.2 |
| 47 | ∞ | BF | | |
| Image plane | ∞ | | | |

TABLE 2

Aspheric surface data $30^{th}$ surface

K = 1.00141E+01, A4 = −3.83964E−06, A6 = −9.27978E−09,
A8 = 9.80778E−11, A10 = −3.00132E−13, A12 = 3.69143E−16,
A14 = 8.53756E−19

$31^{st}$ surface

K = −1.56601E+00, A4 = 2.33763E−06, A6 = −4.63015E−09,
A8 = 5.44291E−11, A10 = 9.02742E−15, A12 = −6.65900E−16,
A14 = 2.27920E−18

(Various Types of Data at Infinity Focus Point)

TABLE 3A

Various types of data
Zoom ratio: 2.66791

| | Wide | Middle | Tele |
|---|---|---|---|
| Focal length | 72.4503 | 120.0005 | 193.2912 |
| F number | 2.85653 | 2.91267 | 2.92713 |
| Angle of view | 16.8530 | 10.1321 | 6.2907 |
| Image height | 21.6300 | 21.6300 | 21.6300 |
| Total lens length | 225.0000 | 224.9999 | 224.9998 |
| BF | 1.0900 | 1.0900 | 1.0900 |
| d6 | 1.0000 | 21.9842 | 40.3077 |
| d16 | 44.0729 | 20.6237 | 1.0000 |
| d18 | 1.0000 | 3.4650 | 4.7651 |
| d35 | 2.4000 | 5.5734 | 3.4440 |
| d39 | 22.5695 | 21.2927 | 26.0456 |
| d41 | 7.9035 | 6.0068 | 3.3833 |
| Entrance pupil position | 82.1783 | 134.7646 | 197.2441 |
| Exit pupil position | −92.4390 | −92.1079 | −96.4288 |
| Anterior principal point | 97.8562 | 98.4306 | 2.9755 |
| Posterior principal point | 152.5684 | 105.0025 | 31.6817 |

TABLE 3B

Data about single lens

| Lens | Start surface | Focal length |
|---|---|---|
| 1 | 1 | −234.5765 |
| 2 | 3 | 157.6379 |
| 3 | 5 | 175.7220 |
| 4 | 7 | 182.3560 |
| 5 | 9 | −53.2606 |
| 6 | 11 | −59.9868 |
| 7 | 13 | 45.3796 |
| 8 | 15 | −72.7218 |
| 9 | 17 | 56.1560 |
| 10 | 19 | 184.7774 |
| 11 | 22 | 109.7534 |
| 12 | 24 | −26.8606 |
| 13 | 26 | −162.5374 |
| 14 | 28 | 63.3790 |
| 15 | 30 | 64.7224 |
| 16 | 32 | −114.6371 |
| 17 | 34 | 66.3563 |
| 18 | 36 | 53.2571 |
| 19 | 38 | −29.3273 |
| 20 | 40 | 72.0600 |
| 21 | 42 | −43.8597 |
| 22 | 44 | 94.9073 |

TABLE 3C

Data about zoom lens groups

| Group | Start surface | Focal length | Lens configuration length | Anterior principal point | Posterior principal point |
|---|---|---|---|---|---|
| 1 | 1 | 130.46702 | 24.00110 | 8.13223 | 15.21362 |
| 2 | 7 | −43.27443 | 28.41520 | 11.62516 | 19.61717 |
| 3 | 17 | 56.15597 | 6.20430 | 1.25824 | 4.03091 |
| 4 | 19 | 88.74426 | 38.59560 | 33.82281 | 43.74123 |
| 5 | 36 | −65.82216 | 4.01340 | 2.24797 | 4.07731 |
| 6 | 40 | 72.06001 | 4.21710 | 2.06190 | 3.82776 |
| 7 | 42 | −81.42384 | 39.51740 | 0.18261 | 3.49061 |

TABLE 3D

Zoom powers of zoom lens groups

| Group | Start surface | Wide | Middle | Tele |
|---|---|---|---|---|
| 1 | 1 | 0.00000 | 0.00000 | 0.00000 |
| 2 | 7 | −0.65787 | −0.96604 | −1.63471 |
| 3 | 17 | −0.80549 | −0.94216 | −0.81485 |
| 4 | 19 | 0.57951 | 0.56044 | 0.59203 |
| 5 | 36 | 2.35010 | 2.23205 | 2.18216 |
| 6 | 40 | 0.52846 | 0.55488 | 0.59149 |
| 7 | 42 | 1.45608 | 1.45588 | 1.45552 |

Second Example of Numerical Values

Following is a second exemplary set of numerical values for the zoom lens system corresponding to the second embodiment shown in FIG. 3. Specifically, as the second example of numerical values, surface data is shown in Table 4, aspheric surface data is shown in Table 5, and various types of data at the infinity focus point are shown in Tables 6A-6D:

TABLE 4

Surface data

| Surface No. | r | d | Nd | vd |
|---|---|---|---|---|
| Object surface | ∞ | | | |
| 1 | 115.01390 | 2.40000 | 1.90366 | 31.3 |
| 2 | 74.87220 | 1.40000 | | |
| 3 | 74.63720 | 10.95010 | 1.43700 | 95.1 |
| 4 | −829.61540 | 0.19990 | | |
| 5 | 74.02740 | 8.89300 | 1.43700 | 95.1 |
| 6 | 1409.09570 | Variable | | |
| 7 | 365.06730 | 3.82440 | 1.75520 | 27.5 |
| 8 | −208.54950 | 0.20000 | | |
| 9 | −1032.78640 | 1.50000 | 1.70154 | 41.1 |
| 10 | 38.85370 | 8.98180 | | |
| 11 | −106.88720 | 1.50000 | 1.49700 | 81.6 |
| 12 | 43.12630 | 0.01000 | 1.56732 | 42.8 |
| 13 | 43.12630 | 5.96460 | 1.90366 | 31.3 |
| 14 | −954.05210 | 3.81390 | | |
| 15 | −50.87530 | 1.50000 | 1.62299 | 58.1 |
| 16 | 337.11630 | Variable | | |
| 17 | 69.94050 | 6.00630 | 1.83400 | 37.3 |
| 18 | −130.24940 | Variable | | |
| 19 | 54.68330 | 3.50000 | 1.49700 | 81.6 |
| 20 | 158.96810 | 2.70000 | | |
| 21 (aperture) | ∞ | 3.00000 | | |
| 22 | −180.40520 | 4.02720 | 1.43700 | 95.1 |
| 23 | −41.07040 | 0.01000 | 1.56732 | 42.8 |
| 24 | −41.07040 | 1.20000 | 1.84666 | 23.8 |
| 25 | 49.55530 | 2.40000 | | |
| 26 | 36.99620 | 1.50000 | 1.84666 | 23.8 |
| 27 | 28.45760 | 0.01000 | 1.56732 | 42.8 |
| 28 | 28.45760 | 6.00000 | 1.49700 | 81.6 |
| 29 | 453.26390 | 0.30000 | | |
| 30* | 85.01880 | 5.40000 | 1.58699 | 59.5 |
| 31* | −61.96600 | 3.00000 | | |
| 32 | −49.36100 | 1.40000 | 1.58144 | 40.9 |
| 33 | −241.88390 | 0.01000 | 1.56732 | 42.8 |
| 34 | −241.88390 | 3.70000 | 1.84666 | 23.8 |
| 35 | −44.20610 | Variable | | |
| 36 | 2185.63770 | 3.30000 | 1.86966 | 20.0 |
| 37 | −47.71770 | 0.01000 | 1.56732 | 42.8 |
| 38 | −47.71770 | 0.70000 | 1.70154 | 41.1 |
| 39 | 34.86430 | Variable | | |
| 40 | 1195.45410 | 3.61240 | 1.72825 | 28.3 |
| 41 | −63.58010 | Variable | | |
| 42 | −44.56940 | 1.40000 | 1.84666 | 23.8 |
| 43 | 816.00560 | 0.20000 | | |
| 44 | 47.24300 | 4.39000 | 1.65844 | 50.9 |
| 45 | 161.73960 | 31.00000 | | |
| 46 | ∞ | 2.10000 | 1.51680 | 64.2 |
| 47 | ∞ | BF | | |
| Image plane | ∞ | | | |

TABLE 5

Aspheric surface data $30^{th}$ surface

K = 9.70174E+00, A4 = −4.09298E−06, A6 = −7.92148E−09, A8 = 9.96901E−11, A10 = −3.04923E−13, A12 = 3.79913E−16, A14 = 1.15209E−18

$31^{st}$ surface

K = −1.83440E+00, A4 = 2.46038E−06, A6 = −3.85122E−09, A8 = 6.35691E−11, A10 = −2.67590E−14, A12 = −6.15399E−16, A14 = 2.63822E−18

(Various Types of Data at Infinity Focus Point)

TABLE 6A

Various types of data
Zoom ratio: 2.6639

| | Wide | Middle | Tele |
|---|---|---|---|
| Focal length | 72.4500 | 120.0900 | 192.9994 |
| F number | 2.87323 | 2.92041 | 2.92669 |
| Angle of view | 16.9028 | 10.1283 | 6.3000 |
| Image height | 21.6300 | 21.6300 | 21.6300 |
| Total lens length | 219.9998 | 219.9997 | 219.9996 |
| BF | 1.0900 | 1.0900 | 1.0900 |
| d6 | 1.0000 | 22.1603 | 40.7544 |
| d16 | 43.6861 | 20.3406 | 0.9998 |
| d18 | 1.0000 | 3.1851 | 3.9316 |
| d35 | 2.4000 | 5.2067 | 2.4000 |
| d39 | 19.5014 | 19.6036 | 25.9734 |
| d41 | 9.3087 | 6.3998 | 2.8368 |
| Entrance pupil position | 81.6010 | 134.5298 | 196.7852 |
| Exit pupil position | −90.1095 | −90.6963 | −96.4174 |
| Anterior principal point | 95.8066 | 95.5910 | 3.3483 |
| Posterior principal point | 147.5606 | 99.8989 | 26.9732 |

TABLE 6B

Data about single lens

| Lens | Start surface | Focal length |
|---|---|---|
| 1 | 1 | −244.3290 |
| 2 | 3 | 157.1853 |
| 3 | 5 | 178.4301 |
| 4 | 7 | 176.2568 |
| 5 | 9 | −53.3445 |
| 6 | 11 | −61.6232 |
| 7 | 13 | 45.7902 |
| 8 | 15 | −70.8494 |
| 9 | 17 | 55.3174 |
| 10 | 19 | 165.8736 |
| 11 | 22 | 120.6245 |
| 12 | 24 | −26.3650 |
| 13 | 26 | −158.3894 |
| 14 | 28 | 60.8097 |
| 15 | 30 | 61.9028 |
| 16 | 32 | −106.9464 |
| 17 | 34 | 63.3446 |
| 18 | 36 | 53.7338 |
| 19 | 38 | −28.6158 |
| 20 | 40 | 82.9968 |

TABLE 6B-continued

Data about single lens

| Lens | Start surface | Focal length |
|---|---|---|
| 21 | 42 | −49.8777 |
| 22 | 44 | 99.8359 |

TABLE 6C

Data about zoom lens groups

| Group | Start surface | Focal length | Lens configuration length | Anterior principal point | Posterior principal point |
|---|---|---|---|---|---|
| 1 | 1 | 128.73845 | 23.84300 | 8.09431 | 15.12369 |
| 2 | 7 | −43.71450 | 27.29470 | 11.24886 | 18.97663 |
| 3 | 17 | 55.31743 | 6.00630 | 1.16001 | 3.84603 |
| 4 | 19 | 84.18946 | 38.15720 | 33.55825 | 43.43835 |
| 5 | 36 | −61.89696 | 4.01000 | 2.33158 | 4.15592 |
| 6 | 40 | 82.99682 | 3.61240 | 1.98706 | 3.50672 |
| 7 | 42 | −99.36182 | 39.09000 | 0.19601 | 3.33607 |

TABLE 6D

Zoom powers of zoom lens groups

| Group | Start surface | Wide | Middle | Tele |
|---|---|---|---|---|
| 1 | 1 | 0.00000 | 0.00000 | 0.00000 |
| 2 | 7 | −0.68244 | −1.01909 | −1.79885 |
| 3 | 17 | −0.77482 | −0.88134 | −0.71367 |
| 4 | 19 | 0.57803 | 0.56368 | 0.60422 |
| 5 | 36 | 2.39708 | 2.25732 | 2.20847 |
| 6 | 40 | 0.56030 | 0.59549 | 0.63852 |
| 7 | 42 | 1.37091 | 1.37070 | 1.37053 |

Third Example of Numerical Values

Following is a third exemplary set of numerical values for the zoom lens system corresponding to the third embodiment shown in FIG. 5. Specifically, as the third example of numerical values, surface data is shown in Table 7, aspheric surface data is shown in Table 8, and various types of data at the infinity focus point are shown in Tables 9A-9D:

TABLE 7

Surface data

| Surface No. | r | d | nd | vd |
|---|---|---|---|---|
| Object surface | ∞ | | | |
| 1 | 131.22820 | 2.40000 | 1.90366 | 31.3 |
| 2 | 79.03970 | 1.40000 | | |
| 3 | 80.3700 | 9.5000 | 1.49700 | 81.6 |
| 4 | ∞ | 0.20000 | | |
| 5 | 76.83580 | 8.90000 | 1.43700 | 95.1 |
| 6 | 1898.65470 | Variable | | |
| 7 | 487.43250 | 3.80000 | 1.60562 | 43.7 |
| 8 | −192.02740 | 0.20000 | | |
| 9 | 856.43360 | 1.50000 | 1.69680 | 55.5 |
| 10 | 40.43500 | 9.62500 | | |
| 11 | −84.65890 | 1.50000 | 1.48749 | 70.4 |
| 12 | 47.18280 | 0.01000 | 1.56732 | 42.8 |
| 13 | 47.18280 | 6.20000 | 1.90366 | 31.3 |
| 14 | −305.28090 | 3.41310 | | |
| 15 | −53.25870 | 1.50000 | 1.60311 | 60.7 |
| 16 | 319.52970 | Variable | | |
| 17 | 64.04950 | 6.40000 | 1.80450 | 39.6 |
| 18 | −141.71410 | Variable | | |

TABLE 7-continued

Surface data

| Surface No. | r | d | nd | vd |
|---|---|---|---|---|
| 19 | 60.12400 | 3.50000 | 1.49700 | 81.6 |
| 20 | 171.57080 | 2.70000 | | |
| 21 (aperture) | ∞ | 3.00000 | | |
| 22 | −173.76030 | 3.79000 | 1.43700 | 95.1 |
| 23 | −44.77020 | 0.01000 | 1.56732 | 42.8 |
| 24 | −44.77020 | 1.20000 | 1.84666 | 23.8 |
| 25 | 50.14780 | 2.40000 | | |
| 26 | 35.43740 | 1.50000 | 1.84666 | 23.8 |
| 27 | 27.25420 | 0.01000 | 1.56732 | 42.8 |
| 28 | 27.25420 | 6.00000 | 1.49700 | 81.6 |
| 29 | 342.12900 | 0.30000 | | |
| 30* | 82.95250 | 5.40000 | 1.58578 | 59.5 |
| 31* | −60.73600 | 3.00000 | | |
| 32 | −43.73030 | 1.40000 | 1.69350 | 53.2 |
| 33 | −320.32490 | 0.01000 | 1.56732 | 42.8 |
| 34 | −320.32490 | 3.70000 | 1.85883 | 30.0 |
| 35 | −43.18870 | Variable | | |
| 36 | ∞ | 3.30000 | 1.86966 | 20.0 |
| 37 | −46.45840 | 0.01000 | 1.56732 | 42.8 |
| 38 | −46.45840 | 0.70000 | 1.70154 | 41.1 |
| 39 | 35.13270 | Variable | | |
| 40 | 491.75140 | 4.20000 | 1.84666 | 23.8 |
| 41 | −61.65070 | Variable | | |
| 42 | −46.98310 | 1.40000 | 1.84666 | 23.8 |
| 43 | 117.64710 | 0.20000 | | |
| 44 | 49.62630 | 5.00000 | 1.71700 | 47.9 |
| 45 | 464.32830 | 31.00000 | | |
| 46 | ∞ | 2.10000 | 1.51680 | 64.2 |
| 47 | ∞ | BF | | |
| Image plane | ∞ | | | |

TABLE 8

Aspheric surface data $30^{th}$ surface

K = 9.97221E+00, A4 = −3.94139E−06, A6 = −6.42008E−09,
A8 = 9.84655E−11, A10 = −2.27304E−13,
A12 = −2.10054E−17, A14 = 2.31090E−18

$31^{st}$ surface

K = −5.11777E+00, A4 = 9.64000E−07, A6 = −3.12961E−09,
A8 = 9.40918E−11, A10 = −1.49427E−13,
A12 = −4.27405E−16, A14 = 3.25178E−18

(Various Types of Data at Infinity Focus Point)

TABLE 9A

Various types of data
Zoom ratio: 2.66392

| | Wide | Middle | Tele |
|---|---|---|---|
| Focal length | 72.4497 | 120.0003 | 193.0002 |
| F number | 2.83239 | 2.89398 | 2.92822 |
| Angle of view | 16.8306 | 10.1115 | 6.2985 |
| Image height | 21.6300 | 21.6300 | 21.6300 |
| Total lens length | 224.9999 | 224.9998 | 224.9998 |
| BF | 1.0900 | 1.0900 | 1.0900 |
| d6 | 1.0000 | 24.4387 | 44.9034 |
| d16 | 47.7393 | 22.3112 | 1.0000 |
| d18 | 1.0000 | 2.9893 | 3.8358 |
| d35 | 2.4000 | 5.2518 | 3.0651 |
| d39 | 20.1578 | 20.0419 | 26.0482 |
| d41 | 9.2347 | 6.4988 | 2.6792 |
| Entrance pupil position | 82.3122 | 137.1747 | 199.6044 |
| Exit pupil position | −92.4947 | −93.3909 | −100.2250 |
| Anterior principal point | 98.0167 | 102.9370 | 20.8829 |
| Posterior principal point | 152.5560 | 104.9713 | 31.9815 |

TABLE 9B

Data about single lens

| Lens | Start surface | Focal length |
|---|---|---|
| 1 | 1 | −224.8428 |
| 2 | 3 | 161.7111 |
| 3 | 5 | 182.9689 |
| 4 | 7 | 227.9454 |
| 5 | 9 | −60.9509 |
| 6 | 11 | −61.9187 |
| 7 | 13 | 45.6044 |
| 8 | 15 | −75.5762 |
| 9 | 17 | 55.6028 |
| 10 | 19 | 184.3168 |
| 11 | 22 | 136.7847 |
| 12 | 24 | −27.7761 |
| 13 | 26 | −152.1896 |
| 14 | 28 | 59.2097 |
| 15 | 30 | 60.7000 |
| 16 | 32 | −73.1785 |
| 17 | 34 | 57.7680 |
| 18 | 36 | 53.4213 |
| 19 | 38 | −28.4149 |
| 20 | 40 | 64.9300 |
| 21 | 42 | −39.5014 |
| 22 | 44 | 77.1079 |

TABLE 9C

Data about zoom lens groups

| Group | Start surface | Focal length | Lens configuration length | Anterior principal point | Posterior principal point |
|---|---|---|---|---|---|
| 1 | 1 | 140.56785 | 22.40000 | 7.18213 | 14.08919 |
| 2 | 7 | −49.01584 | 27.74810 | 11.11715 | 18.65388 |
| 3 | 17 | 55.60279 | 6.40000 | 1.11953 | 3.92297 |
| 4 | 19 | 101.72930 | 37.92000 | 34.91726 | 45.25012 |
| 5 | 36 | −61.27816 | 4.01000 | 2.27736 | 4.10377 |
| 6 | 40 | 64.93002 | 4.20000 | 2.02806 | 3.94574 |
| 7 | 42 | −81.84831 | 39.70000 | −0.20157 | 3.25714 |

TABLE 9D

Zoom powers of zoom lens groups

| Group | Start surface | Wide | Middle | Tele |
|---|---|---|---|---|
| 1 | 1 | 0.00000 | 0.00000 | 0.00000 |
| 2 | 7 | −0.68916 | −1.02790 | −1.80069 |
| 3 | 17 | −0.65303 | −0.72853 | −0.59859 |
| 4 | 19 | 0.65527 | 0.64608 | 0.68098 |
| 5 | 36 | 2.60136 | 2.40563 | 2.28332 |
| 6 | 40 | 0.46061 | 0.50299 | 0.56174 |
| 7 | 42 | 1.45864 | 1.45822 | 1.45835 |

Fourth Example of Numerical Values

Following is a fourth exemplary set of numerical values for the zoom lens system corresponding to the fourth embodiment shown in FIG. 7. Specifically, as the fourth example of numerical values, surface data is shown in Table 10, aspheric surface data is shown in Table 11, and various types of data at the infinity focus point are shown in Tables 12A-12D:

TABLE 10

Surface data

| Surface No. | r | d | nd | vd |
|---|---|---|---|---|
| Object surface | ∞ | | | |
| 1 | 112.14470 | 2.40000 | 1.90366 | 31.3 |
| 2 | 81.82260 | 1.40000 | | |
| 3 | 81.60250 | 9.50720 | 1.43700 | 95.1 |
| 4 | −3497.51790 | 0.20000 | | |
| 5 | 99.50410 | 10.51410 | 1.43700 | 95.1 |
| 6 | 1686.59580 | Variable | | |
| 7 | 182.85300 | 6.00010 | 1.75520 | 27.5 |
| 8 | −256.98530 | 0.32110 | | |
| 9 | −574.84080 | 1.50000 | 1.70154 | 41.1 |
| 10 | 38.86560 | 8.96550 | | |
| 11 | −284.44910 | 1.50000 | 1.49700 | 81.6 |
| 12 | 41.26090 | 0.01000 | 1.56732 | 42.8 |
| 13 | 41.26090 | 4.46010 | 1.90366 | 31.3 |
| 14 | 162.74970 | 4.61500 | | |
| 15 | −49.82840 | 1.50000 | 1.62299 | 58.1 |
| 16 | −271.91750 | Variable | | |
| 17 | 79.61000 | 5.00900 | 1.83400 | 37.3 |
| 18 | −155.95020 | 1.00000 | | |
| 19 | 46.62130 | 3.50000 | 1.49700 | 81.6 |
| 20 | 106.00950 | 2.70000 | | |
| 21 (aperture) | ∞ | 3.00000 | | |
| 22 | −545.78210 | 6.60380 | 1.43700 | 95.1 |
| 23 | −44.29830 | 0.01000 | 1.56732 | 42.8 |
| 24 | −44.29830 | 1.20000 | 1.84666 | 23.8 |
| 25 | 53.63890 | 2.40000 | | |
| 26 | 40.47650 | 1.50000 | 1.84666 | 23.8 |
| 27 | 30.58110 | 0.01000 | 1.56732 | 42.8 |
| 28 | 30.58110 | 6.00000 | 1.49700 | 81.6 |
| 29 | 247.48790 | 0.30000 | | |
| 30* | 88.75590 | 5.40000 | 1.58699 | 59.5 |
| 31* | −61.48970 | 3.00000 | | |
| 32 | −51.39790 | 1.40000 | 1.58144 | 40.9 |
| 33 | −279.49130 | 0.01000 | 1.56732 | 42.8 |
| 34 | −279.49130 | 3.70000 | 1.84666 | 23.8 |
| 35 | −45.55050 | Variable | | |
| 36 | −1582.98910 | 3.37950 | 1.86966 | 20.0 |
| 37 | −43.84120 | 0.01000 | 1.56732 | 42.8 |
| 38 | −43.84120 | 0.70000 | 1.70154 | 41.1 |
| 39 | 38.76340 | Variable | | |
| 40 | 96.79470 | 4.73480 | 1.72825 | 28.3 |
| 41 | −87.12640 | Variable | | |
| 42 | −48.64120 | 1.40000 | 1.84666 | 23.8 |
| 43 | 125.55010 | 0.20000 | | |
| 44 | 43.22890 | 4.31970 | 1.65844 | 50.9 |
| 45 | 114.19170 | 31.00000 | | |
| 46 | ∞ | 2.10000 | 1.51680 | 64.2 |
| 47 | ∞ | BF | | |
| Image plane | ∞ | | | |

TABLE 11

Aspheric surface data $30^{th}$ surface

K = 1.25623E+01, A4 = −3.63281E−06, A6 = −8.21499E−09,
A8 = 9.56442E−11, A10 = −2.82844E−13,
A12 = 4.08799E−16, A14 = 9.50559E−19

$31^{st}$ surface

K = −1.84110E+00, A4 = 2.47963E−06, A6 = −4.00963E−09,
A8 = 6.19911E−11, A10 = −2.42940E−14,
A12 = −5.02635E−16, A14 = 2.32780E−18

(Various Types of Data at Infinity Focus Point)
(Table 12A: Various Types of Data)

TABLE 12A

Various types of data
Zoom ratio: 2.67241

|  | Wide | Middle | Tele |
|---|---|---|---|
| Focal length | 72.4498 | 119.9979 | 193.6156 |
| F number | 2.89921 | 2.91360 | 2.92705 |
| Angle of view | 16.8894 | 10.1319 | 6.2809 |
| Image height | 21.6300 | 21.6300 | 21.6300 |
| Total lens length | 229.9997 | 229.9996 | 229.9996 |
| BF | 1.0900 | 1.0900 | 1.0900 |
| d6 | 1.3025 | 28.0338 | 49.8241 |
| d16 | 49.5216 | 22.7904 | 1.0000 |
| d35 | 2.4000 | 4.7354 | 2.6403 |
| d39 | 23.4616 | 20.5600 | 24.6055 |
| d41 | 4.7441 | 5.3101 | 3.3598 |
| Entrance pupil position | 89.6041 | 153.2780 | 216.6798 |
| Exit pupil position | −91.4492 | −89.2564 | −92.7287 |
| Anterior principal point | 104.6632 | 111.9143 | 6.2153 |
| Posterior principal point | 157.5609 | 109.9827 | 36.4265 |

TABLE 12B

Data about single lens

| Lens | Start surface | Focal length |
|---|---|---|
| 1 | 1 | −347.9529 |
| 2 | 3 | 182.6231 |
| 3 | 5 | 241.4868 |
| 4 | 7 | 142.3023 |
| 5 | 9 | −51.8395 |
| 6 | 11 | −72.3927 |
| 7 | 13 | 60.1195 |
| 8 | 15 | −98.1816 |
| 9 | 17 | 63.8124 |
| 10 | 19 | 164.2327 |
| 11 | 22 | 109.8832 |
| 12 | 24 | −28.4954 |
| 13 | 26 | −158.7797 |
| 14 | 28 | 69.5680 |
| 15 | 30 | 62.7166 |
| 16 | 32 | −108.5618 |
| 17 | 34 | 63.8126 |
| 18 | 36 | 51.7947 |
| 19 | 38 | −29.2234 |
| 20 | 40 | 63.6541 |
| 21 | 42 | −41.2560 |
| 22 | 44 | 103.1558 |

TABLE 12C

Data about zoom lens groups

| Group | Start surface | Focal length | Lens configuration length | Anterior principal point | Posterior principal point |
|---|---|---|---|---|---|
| 1 | 1 | 151.01504 | 24.02130 | 5.89093 | 12.98879 |
| 2 | 7 | −48.29943 | 28.87180 | 13.30140 | 20.72990 |
| 3 | 17 | 47.40103 | 46.74280 | 21.79787 | 20.96308 |
| 4 | 36 | −67.56068 | 4.08950 | 2.25037 | 4.11657 |
| 5 | 40 | 63.65407 | 4.73480 | 1.45765 | 3.42275 |
| 6 | 42 | −67.87039 | 39.01970 | 0.74047 | 3.86678 |

TABLE 12D

Zoom powers of zoom lens groups

| Group | Start surface | Wide | Middle | Tele |
|---|---|---|---|---|
| 1 | 1 | 0.00000 | 0.00000 | 0.00000 |
| 2 | 7 | −0.62662 | −0.95931 | −1.69130 |
| 3 | 17 | −0.42848 | −0.47419 | −0.41753 |
| 4 | 36 | 2.23126 | 2.21887 | 2.17666 |
| 5 | 40 | 0.52198 | 0.51329 | 0.54352 |
| 6 | 42 | 1.53416 | 1.53372 | 1.53463 |

Note that the embodiments described above are only examples of the present disclosure and should not be construed as limiting. Rather, each of those embodiments may be readily modified, replaced, combined with other embodiments, or partially omitted in various manners without departing from the scope of the appended claims and their equivalents.

(Values Corresponding to Inequalities)

The zoom lens systems according to the first to fourth embodiments were actually implemented with these first to fourth examples of numerical values.

Values, corresponding to the Inequalities (1) to (4), of the respective examples of numerical values are shown in the following Table 13:

(Table 13: Values Corresponding to Inequalities)

TABLE 13

|  | Inequality (1) | Inequality (2) | Inequality (3) | Inequality (4) |
|---|---|---|---|---|
| $1^{st}$ example of numerical values | −0.192 | −2.79 | 81.6 | 95.1 |
| $2^{nd}$ example of numerical values | −0.199 | −2.97 | 81.6 | 95.1 |
| $3^{rd}$ example of numerical values | −0.218 | −2.83 | 81.6 | 95.1 |
| $4^{th}$ example of numerical values | −0.210 | −2.60 | 81.6 | 95.1 |

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for digital still camera systems, digital camcorder systems, and other camera systems that require high image quality.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A zoom lens system comprising:
a first lens group having positive power;
a second lens group having negative power; and
following lens groups,
the first, second, and following lens groups being arranged in this order such that the first lens group is located closer to an object than any other lens group and that the following lens groups are located closer to an image than any other lens group, wherein the following lens groups including:

a first focus lens group having negative power; and a second focus lens group having positive power, being arranged adjacent to the first focus lens group and being closer to the image than the first focus lens group is, the first and second focus lens groups moving along an optical axis while the zoom lens system is focusing from an infinity focus point on a close focus point, wherein while the zoom lens system is zooming from a wide-angle end toward a telephoto end, intervals between respective lens groups change, the first lens group is fixed with respect to an image plane, the zoom lens system satisfies the following Inequality (1):

$$-0.23 < f2/TTL < -0.15 \quad (1)$$

where TTL is an optical total length at the telephoto end and f2 is a focal length of the second lens group, and the first focus lens group satisfies the following Inequality (2):

$$-3.2 < (1-\beta1 \times \beta1) \times (\beta2 \times \beta2) < -2.4 \quad (2)$$

where β1 is a lateral magnification at the telephoto end of the first focus lens group and β2 is a lateral magnification of an optical system at the telephoto end, the optical system being located closer to the image than the first focus lens group is.

2. The zoom lens system of claim 1, wherein the second lens group includes:

a first lens having positive power;

a second lens having negative power;

a third lens having negative power;

a fourth lens having positive power; and a fifth lens having negative power, the first, second, third, fourth, and fifth lenses being arranged in this order such that the first lens is located closer to the object than any other lens is.

3. The zoom lens system of claim 2, wherein the first focus lens group includes: a lens having positive power; and a lens having negative power, and the second focus lens group consists of a lens having positive power.

4. The zoom lens system of claim 2, wherein the following lens groups include an aperture stop, and a lens located adjacent to, and closer to the object than, the aperture stop and a lens located adjacent to, and closer to the image than, the aperture stop have positive power, and satisfy the following Inequalities (3) and (4):

$$vd1 > 65 \quad (3)$$

$$vd2 > 65 \quad (4)$$

where vd1 is an abbe number of the lens located adjacent to, and closer to the object than, the aperture stop and vd2 is an abbe number of the lens located adjacent to, and closer to the image than, the aperture stop.

5. A lens barrel comprising:

the zoom lens system of claim 2; and a lens mount, the lens barrel being configured to be connected removably to a camera body via the lens mount, the camera body including an image sensor configured to receive an optical image and transform the optical image into an electrical image signal, the lens barrel forming the optical image on the image sensor.

6. An image capture device configured to transform an optical image of an object into an electrical image signal and display and/or store the image signal transformed, the image capture device comprising:

the zoom lens system of claim 2 configured to form the optical image of the object; and an image sensor configured to transform the optical image formed by the zoom lens system into the electrical image signal.

7. The zoom lens system of claim 1, wherein the first focus lens group includes: a lens having positive power; and a lens having negative power, and the second focus lens group consists of a lens having positive power.

8. The zoom lens system of claim 7, wherein the following lens groups include an aperture stop, and a lens located adjacent to, and closer to the object than, the aperture stop and a lens located adjacent to, and closer to the image than, the aperture stop have positive power, and satisfy the following Inequalities (3) and (4):

$$vd1 > 65 \quad (3)$$

$$vd2 > 65 \quad (4)$$

where vd1 is an abbe number of the lens located adjacent to, and closer to the object than, the aperture stop and vd2 is an abbe number of the lens located adjacent to, and closer to the image than, the aperture stop.

9. A lens barrel comprising:

the zoom lens system of claim 7; and a lens mount, the lens barrel being configured to be connected removably to a camera body via the lens mount, the camera body including an image sensor configured to receive an optical image and transform the optical image into an electrical image signal, the lens barrel forming the optical image on the image sensor.

10. The zoom lens system of claim 1, wherein the following lens groups include an aperture stop, and a lens located adjacent to, and closer to the object than, the aperture stop and a lens located adjacent to, and closer to the image than, the aperture stop have positive power, and satisfy the following Inequalities (3) and (4):

$$vd1 > 65 \quad (3)$$

$$vd2 > 65 \quad (4)$$

where vd1 is an abbe number of the lens located adjacent to, and closer to the object than, the aperture stop and vd2 is an abbe number of the lens located adjacent to, and closer to the image than, the aperture stop.

11. A lens barrel comprising:

the zoom lens system of claim 10; and a lens mount, the lens barrel being configured to be connected removably to a camera body via the lens mount, the camera body including an image sensor configured to receive an optical image and transform the optical image into an electrical image signal, the lens barrel forming the optical image on the image sensor.

12. A lens barrel comprising:
the zoom lens system of claim 1; and
a lens mount,
the lens barrel being configured to be connected removably to a camera body via the lens mount, the camera body including an image sensor configured to receive an optical image and transform the optical image into an electrical image signal,
the lens barrel forming the optical image on the image sensor.

13. An image capture device configured to transform an optical image of an object into an electrical image signal and display and/or store the image signal transformed, the image capture device comprising:
the zoom lens system of claim 1 configured to form the optical image of the object; and
an image sensor configured to transform the optical image formed by the zoom lens system into the electrical image signal.

14. A camera system comprising:
an interchangeable lens unit including the zoom lens system of claim 1; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

* * * * *